(12) United States Patent
Kato et al.

(10) Patent No.: US 8,159,182 B2
(45) Date of Patent: Apr. 17, 2012

(54) CONTACTLESS POWER TRANSFERRING COIL UNIT, MOBILE TERMINAL, POWER TRANSMITTING APPARATUS, AND CONTACTLESS POWER TRANSFERRING SYSTEM

(75) Inventors: Hiroshi Kato, Kanagawa (JP); Kuniharu Suzuki, Tokyo (JP); Katsuya Suzuki, Gunma (JP); Manabu Yamazaki, Kanagawa (JP); Kota Onishi, Aichi (JP); Kentaro Yoda, Nagano (JP); Yoichiro Kondo, Nagano (JP); Mikimoto Jin, Nagano (JP); Takahiro Kamijo, Nagano (JP); Haruhiko Sogabe, Nagano (JP)

(73) Assignees: Sony Mobile Communications Japan, Inc., Tokyo (JP); Seiko Epson Corporation, Tokyo (JP)

( * ) Notice: Subject to any disclaimer, the term of this patent is extended or adjusted under 35 U.S.C. 154(b) by 922 days.

(21) Appl. No.: 12/153,934

(22) Filed: May 28, 2008

(65) Prior Publication Data
US 2008/0297107 A1 Dec. 4, 2008

(30) Foreign Application Priority Data
May 28, 2007 (JP) ................. 2007-140893

(51) Int. Cl.
*H02J 7/00* (2006.01)
*G01R 33/00* (2006.01)
*G01R 33/02* (2006.01)
*G01B 7/14* (2006.01)
*H01F 38/12* (2006.01)
*H01F 27/20* (2006.01)

(52) U.S. Cl. ...... 320/108; 320/114; 320/115; 336/84 M; 336/232; 324/200; 324/207.15; 324/244; 324/260

(58) Field of Classification Search .................. 320/108, 320/107, 133, 137, 134, 135, 136, 114, 115, 320/116, 155; 336/84 M, 232, 40, 30; 324/200, 324/210, 244, 260
See application file for complete search history.

(56) References Cited

U.S. PATENT DOCUMENTS

| | | | | |
|---|---|---|---|---|
| 6,100,663 | A * | 8/2000 | Boys et al. ................... | 320/108 |
| 7,230,353 | B2 * | 6/2007 | Hsu et al. ..................... | 307/66 |
| 7,551,460 | B2 * | 6/2009 | Lalithambika et al. ..... | 363/21.16 |
| 7,633,266 | B2 * | 12/2009 | Lu et al. ....................... | 320/140 |
| 2005/0165461 | A1 | 7/2005 | Takeda et al. | |
| 2005/0195623 | A1 * | 9/2005 | Park ............................... | 363/18 |
| 2007/0228833 | A1 * | 10/2007 | Stevens et al. ................. | 307/45 |
| 2007/0274107 | A1 * | 11/2007 | Garner et al. ............... | 363/21.12 |
| 2009/0261778 | A1 * | 10/2009 | Kook .............................. | 320/108 |
| 2010/0066305 | A1 * | 3/2010 | Takahashi et al. ............ | 320/108 |

FOREIGN PATENT DOCUMENTS

| JP | 2003-037949 A | 2/2003 |
|---|---|---|
| JP | 2006-042519 | 2/2006 |
| JP | 2006-042519 A | 2/2006 |

* cited by examiner

*Primary Examiner* — Edward Tso
*Assistant Examiner* — Alexis Boateng
(74) *Attorney, Agent, or Firm* — Rader, Fishman & Grauer PLLC

(57) ABSTRACT

A contactless power transferring coil unit is provided. The contactless power transferring coil unit includes a flat coil, a magnetic film, and a leaking flux detecting coil. The flat coil is formed by winding a conductive wire into a spiral on a substantially flat plane. The magnetic film is disposed so as to cover one entire flat surface of the flat coil. The leaking flux detecting coil is disposed in a periphery outside an outer edge of the flat coil and the magnetic film and detects leaking magnetic flux from the flat coil.

8 Claims, 18 Drawing Sheets

VOLTAGE GENERATED BY
LEAKING MAGNETIC FLUX
DETECTING COIL

VOLTAGE GENERATED BY
LEAKING MAGNETIC FLUX
DETECTING COIL 42Y+ AND
LEAKING MAGNETIC FLUX
DETECTING COIL 42X+

− DISPLACEMENT BETWEEN
CENTER POSITIONS OF COILS

+ DISPLACEMENT BETWEEN
CENTER POSITIONS OF COILS

VOLTAGE GENERATED BY
LEAKING MAGNETIC FLUX
DETECTING COIL

VOLTAGE GENERATED BY
LEAKING MAGNETIC FLUX
DETECTING COIL 42Y− AND
LEAKING MAGNETIC FLUX
DETECTING COIL 42X−

DISPLACEMENT BETWEEN
CENTER POSITIONS OF COILS

DISPLACEMENT BETWEEN
CENTER POSITIONS OF COILS

CONTACTLESS POWER TRANSFERRING COIL UNIT, MOBILE TERMINAL, POWER TRANSMITTING APPARATUS, AND CONTACTLESS POWER TRANSFERRING SYSTEM

CROSS REFERENCES TO RELATED APPLICATIONS

The present invention contains subject matter related to Japanese Patent Application JP 2007-140893 filed in the Japanese Patent Office on May 28, 2007, the entire contents of which being incorporated herein by reference.

BACKGROUND OF THE INVENTION

1. Field of the Invention

The invention relates to a contactless power transferring coil unit for transferring power by a contactless method using electromagnetic induction such as when charging secondary cells incorporated in a small and slim mobile terminal (for example, a mobile-phone unit). The invention further relates to a mobile terminal in which the contactless power transferring coil unit is incorporated, a power transmitting apparatus that transfers power to a mobile terminal or the like using a contactless power transferring coil, and a contactless power transferring system including such devices.

2. Description of the Related Art

An existing system is known for transferring charging power, which is used to charge secondary cells incorporated in a mobile terminal for example, via contactless power transferring coils using magnetic induction.

Japanese Unexamined Patent Application Publication No. 2006-42519 (see FIG. 2 and FIG. 3) discloses the use of a flat coil, which is formed by winding a wire which is composed of a solid wire or a twisted wire with an insulating layer on the surface thereof into a spiral on a substantially flat plane, as a contactless power transferring coil installed in a mobile terminal, such as a mobile-phone unit, that may need to be made slim. This publication also discloses that a magnetic sheet for suppressing unneeded radiation due to the magnetic fields produced from a power-transmitting flat coil and a power-receiving flat coil when such coils are disposed facing one another is provided on the opposite surface of each coil to the facing surfaces so as to entirely cover such opposite surfaces.

SUMMARY OF THE INVENTION

However, when contactless power transfer is carried out in a state where the primary transfer coil on the power transmitting side and the secondary transfer coil on the power transmitting side are disposed facing one another, if the center positions of the primary transfer coil and the secondary transfer coil are displaced, for example, there may be a fall in the efficiency of the contactless power transfer between the coils.

This means that when contactless power transfer is carried out between a primary transfer coil provided in a cradle and a secondary transfer coil provided in a mobile terminal, for example, to charge secondary cells of the mobile terminal, in a case where the center positions of both coils are displaced so that the power transferring efficiency falls and the power consumption of the mobile terminal exceeds the power supplied from the cradle, the charging power will be insufficient to charge the rechargeable battery of the mobile terminal. Here, if more power is transferred from the cradle to compensate for the charging power being insufficient, there will be an increase in the amount of heat generated by the coil. In addition, there will also be an increase in the heat generated by the mobile terminal that has been positioned on a terminal mount of the cradle.

On the other hand, if the contactless power transfer is stopped when the displacement of the center positions of the coils exceeds a set amount, for example, it will be possible to prevent the generation of heat by the coil. However, in such case, although the user may think that the mobile terminal is being charged, charging is not actually being carried out, which is extremely inconvenient for the user.

Also, although it is also possible to use a cradle design where the mobile terminal is forcibly disposed at the ideal position so that the centers of the coils do not become displaced, in such case, there are limits on both the form of the mobile terminal and the form of the terminal mount of the cradle, resulting in reduced design freedom for the terminal design and cradle design. That is, the respective cradles for various types of mobile terminals of different forms will only be compliant with one out of the different types of terminal, so that the user will have to buy a new cradle every time the user changes his or her mobile terminal, which is extremely costly for the user.

It is desirable to provide a contactless power transferring coil unit, a mobile terminal, a power transmitting apparatus, and a contactless power transferring system that can suppress generation of heat due to displacements between center positions of coils during contactless power transferring, can suppress a fall in transfer efficiency, can thoroughly avoid a situation where the transfer of power stops due to a displacement between the center positions of the coils, and can also reduce the cost to the user.

According to an embodiment of the invention, there is provided a contactless power transferring coil unit including a flat coil, a magnetic film, and a leaking flux detecting coil. The flat coil is formed by winding a conductive wire into a spiral on a substantially flat plane. The magnetic film is disposed so as to cover one entire flat surface of the flat coil. The leaking flux detecting coil is disposed in a periphery outside an outer edge of the flat coil and the magnetic film and detects leaking magnetic flux from the flat coil.

According to another embodiment of the invention, there is provided a mobile terminal including a secondary cell, a contactless power transferring coil unit, a charging control circuit, and a signal transmitting unit. The contactless power transferring coil unit includes a flat coil formed by winding a conductive wire into a spiral on a substantially flat plane, a magnetic film disposed so as to cover one entire flat surface of the flat coil, and a leaking flux detecting coil that is disposed in a periphery outside an outer edge of the flat coil and the magnetic film and detects leaking magnetic flux from the flat coil. The contactless power transferring coil unit uses electromagnetic induction between the flat coil and a coil provided in a power transmitting apparatus for transmitting power according to a contactless power transferring method to receive power transmitted from the power transmitting apparatus according to the contactless power transferring method. The charging control circuit controls charging of the secondary cell with the power received via the flat coil of the contactless power transferring coil unit. The signal transmitting unit transmits a signal, in accordance with leaking magnetic flux detected by the leaking flux detecting coil of the contactless power transferring coil unit, to the power transmitting apparatus.

According to further embodiment of the invention, there is provided a power transmitting apparatus including a terminal mount, a contactless power transferring coil, a signal receiving unit and a power transfer control unit. A predetermined mobile terminal that includes a secondary cell is mounted on the terminal mount. The contactless power transferring coil includes a flat coil formed by winding a conductive wire into a spiral on a substantially flat plane and uses electromagnetic induction between the flat coil and a coil installed in the predetermined mobile terminal to carry out contactless transfer of power for charging the secondary cell of the mobile terminal. The signal receiving unit receives, from the mobile terminal, a signal in accordance with leaking magnetic flux of the coil of the mobile terminal. The power transfer control unit controls transfer of power from the flat coil of the contactless power transferring coil based on the signal in accordance with the leaking magnetic flux received by the signal receiving unit.

According to further another embodiment of the invention, there is provided a contactless power transferring system including a mobile terminal and a power transmitting apparatus. The mobile terminal includes a contactless power transferring coil that is a secondary side during contactless power transferring and a leaking flux detecting coil that detects leaking magnetic flux from the secondary-side contactless power transferring coil. The power transmitting apparatus includes a contactless power transferring coil that is a primary side during contactless power transferring and transfers power to the mobile terminal using electromagnetic induction between the primary-side contactless power transferring coil and the secondary-side contactless power transferring coil of the mobile terminal. The mobile terminal feeds back a signal in accordance with the leaking magnetic flux detected by the leaking flux detecting coil to the power transmitting apparatus, and the power transmitting apparatus controls transfer of power from the primary-side contactless power transferring coil based on the signal in accordance with the leaking magnetic flux fed back from the mobile terminal.

In other words, when the center positions of the primary-side and secondary-side contactless power transferring coils are displaced, leaking magnetic flux will be generated by at least the secondary-side contactless power transferring coil. According to embodiments of the invention, the displacement between the center positions of the coils can be detected by detecting such leaking magnetic flux using a leaking flux detecting coil. Also, in the power transmitting apparatus according to the embodiment of the invention, it is possible to know, based on the output of the leaking flux detecting coil on the secondary side, that a displacement has occurred between the center positions of the coils. In that case, the transfer of power from the primary-side contactless power transferring coil is controlled so that a larger generated voltage is obtained by the secondary-side contactless power transferring coil unit and the leaking magnetic flux is reduced.

According to embodiments of the invention, when a displacement has occurred between the center positions of the primary and secondary-side contactless power transferring coils, the leaking magnetic flux that leaks from the secondary-side contactless power transferring coil is detected, and power transfer from the primary-side contactless power transferring coil is controlled based on the detection output. By doing so, it is possible to suppress the generation of heat and suppress a fall in the transfer efficiency due to the displacement in the center positions of the coils during contactless power transferring. In addition, it becomes possible to thoroughly avoid a situation where the transfer of power stops due to a displacement between the center positions of the coils, and as a result, it is possible to improve the usability for users. Also, according to embodiments the invention, even when the center positions of the coils are displaced by a certain distance, it is possible to suppress the generation of heat and carry out power transferring with favorable efficiency. This means that there may be little need to use a cradle design where the mobile terminal is forcibly placed at an ideal position, so that the user will be able to continue using the same cradle even when the user buys a new mobile terminal. As a result, it is possible to reduce the cost to the user.

DESCRIPTION OF THE PREFERRED EMBODIMENTS

Preferred embodiments of the invention will now be described with reference to the attached drawings.

In the embodiment, an example of a flat coil formed by winding a conductive wire, such as a solid wire, a twisted wire, or a flat pattern, into a spiral on a substantially flat plane is described as a "contactless power transferring coil" according to an embodiment of the invention. Further, a mobile-phone unit including the flat coil described above as a secondary coil for contactless power transfer is described as one example of a "mobile terminal" according to an embodiment of the invention. Furthermore, a cradle that is capable of charging at least the mobile-phone unit described above and includes the flat coil described above as a primary coil for contactless power transfer is described as one example of a "power transmitting apparatus" according to an embodiment of the invention. Moreover, a system including such mobile-phone unit and cradle is described as one example of a "contactless power transferring system" according to an embodiment of the invention. However, it should be appreciated that the details thereof given below are examples and that embodiments of the invention are not limited thereto.

Figure 1:
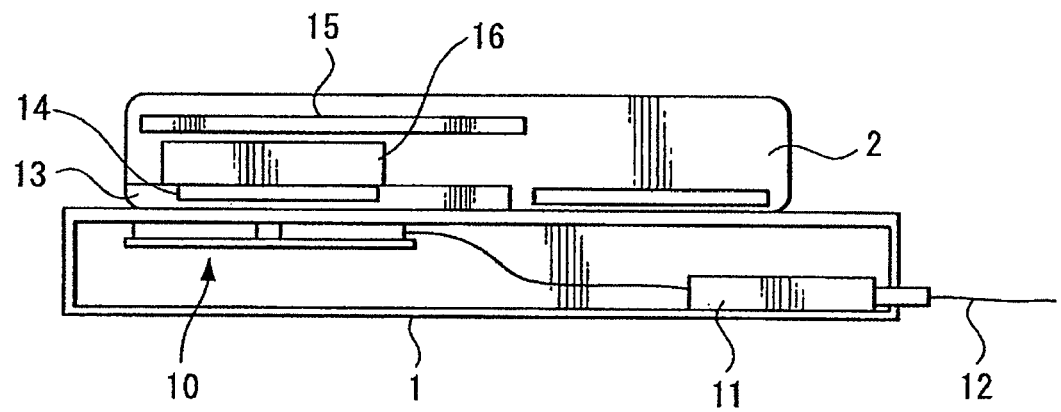
FIG. 1 is a diagram showing the overall internal construction of principal parts of a mobile-phone unit and cradle according to an embodiment of the invention.

Overall Constructions of Mobile-Phone Unit and Cradle, and Basic Operation During Charging FIG. 1 is a schematic diagram showing the construction of principal parts that relate to contactless power transfer carried out between a mobile-phone unit 2 and a cradle 1 according to the embodiment.

The mobile-phone unit 2 according to the embodiment includes, inside a unit casing, at least a battery 16, a secondary-side transfer coil 14, and a circuit board 15. The battery 16 includes secondary cells that provide operation power for the unit. The secondary-side transfer coil 14 acts as a power-receiving contactless power transferring coil during charging of the battery 16. Various electronic circuits, including a charging control circuit for supplying power received via the secondary-side transfer coil 14 to the battery 16 to charge the battery 16, are mounted on the circuit board 15. Note that in the embodiment, other component elements that are included in a typical mobile-phone unit have been omitted from the drawings and the description.

The battery 16 mentioned above is detachable and for this reason, a battery cover 13 that is opened and closed (or attached and detached) when attaching and detaching the battery 16 to the mobile-phone unit 2 is provided.

The secondary-side transfer coil 14 is composed of a flat coil formed by winding a conductive wire that conducts electricity into a spiral, and one flat surface of the secondary-side transfer coil 14 is stuck to an inner wall surface of the battery cover 13 or to an outer surface of the battery 16 on the battery cover 13-side. In the embodiment, the secondary-side transfer coil 14 is stuck to the battery cover 13 described above.

On the other hand, the cradle 1 according to the embodiment includes at least a primary-side transfer coil 10, a control circuit unit 11, and a power cord 12. The primary-side transfer coil 10 acts as a power-transmitting contactless power transferring coil when charging the battery 16 of the mobile-phone unit 2. The control circuit unit 11 supplies power to and controls the primary-side transfer coil 10 described above. The power cord 12 is connected to a domestic power supply, for example. Note that in the embodiment, other component elements that are included in a typical cradle have been omitted from the drawings and the description.

In substantially the same way as the secondary-side transfer coil 14 of the mobile-phone unit 2, the primary-side transfer coil 10 of the cradle 1 is a flat coil formed by winding a conductive wire that conducts electricity into a spiral, and one flat portion of the primary-side transfer coil 10 is stuck to an inner wall surface of a flat terminal mount that is provided on the cradle 1 with a given size.

The control circuit unit 11 is capable of detecting voltage variations that accompany changes in the state of a magnetic field of the primary-side transfer coil 10 when the state of such magnetic field changes. Such change is caused by the secondary-side transfer coil 14 of the mobile-phone unit 2 and the primary-side transfer coil 10 of the cradle 1 being disposed near one another when the mobile-phone unit 2 is placed on the terminal mount of the cradle 1. The control circuit unit 11 determines that the mobile-phone unit 2 has been placed on the terminal mount of the cradle 1 on detecting that a voltage, which is due to the voltage variations that accompany changes in the state of the magnetic field of the primary-side transfer coil 10 when the secondary-side transfer coil 14 has been disposed nearby, has reached a predetermined voltage set in advance.

In the same way, the charging control circuit of the mobile-phone unit 2 according to the embodiment is capable of detecting voltage variations that accompany changes in the state of a magnetic field inside the secondary-side transfer coil 14 when such changes occur. Such change is caused by the mobile-phone unit 2 having been placed on the terminal mount of the cradle 1 so that the secondary-side transfer coil 14 and the primary-side transfer coil 10 of the cradle 1 are disposed near one another. The charging control circuit of the mobile-phone unit 2 determines that the mobile-phone unit 2 has been placed on the terminal mount of the cradle 1 on detecting that a voltage, which is due to the voltage variations that accompany changes in the state of the magnetic field of the secondary-side transfer coil 14 when the primary-side transfer coil 10 described above has been disposed nearby, has reached a predetermined voltage set in advance.

Also, in the embodiment, the cradle 1 and the mobile-phone unit 2 can also transmit information via the primary-side transfer coil 10 and the secondary-side transfer coil 14 described above. For example, the mobile-phone unit 2 described above has been placed on the terminal mount of the cradle 1. Then, it is detected that the primary-side transfer coil 10 and the secondary-side transfer coil 14 are disposed near one another based on changes in the state of the magnetic fields as described above. Here, the cradle 1 and the mobile-phone unit 2 exchange identification information for authorizing one another by transmitting information via the primary-side transfer coil 10 and the secondary-side transfer coil 14 described above.

Also, in the embodiment, when the cradle 1 and the mobile-phone unit 2 have detected that the primary-side transfer coil 10 and the secondary-side transfer coil 14 are disposed near one another and the cradle 1 and the mobile-phone unit 2 have been able to authorize one another, power is transferred from the cradle 1 and charging of the battery 16 of the mobile-phone unit 2 is carried out using the transferred power.

When charging of the battery 16 of the mobile-phone unit 2 has been started in this way, the control circuit unit 11 of the cradle 1 converts the domestic AC voltage supplied via the power cord 12 to a predetermined DC voltage, generates an AC voltage of a predetermined frequency using the DC voltage, supplies the generated AC voltage to the primary-side transfer coil 10, and causes the primary-side transfer coil 10 to oscillate at a predetermined resonant frequency.

On the other hand, on the mobile-phone unit 2 side, when an AC voltage is induced in the secondary-side transfer coil 14 due to the oscillation of the primary-side transfer coil 10 of the cradle 1, the induced AC voltage is rectified to convert the voltage to a DC voltage and the battery 16 is charged using the DC voltage.

The voltage value based on changes in the state of the primary-side transfer coil 10 may be no longer equal to the predetermined voltage value set in advance or the voltage value based on changes in the state of the primary-side transfer coil 10 may be equal to a predetermined voltage value set in advance but it has not been possible to authorize the other device based on the identification information. In such case, in the embodiment, the control circuit unit 11 of the cradle 1 determines that the changes in the state of the magnetic field of the primary-side transfer coil 10 were caused by a metal object, such as a coin, or another conductive object having been placed on the terminal mount, and carries out control so that power is not supplied to the primary-side transfer coil 10.

Also, in the embodiment, when the battery 16 of the mobile-phone unit 2 is being charged by transferring power from the cradle 1, charging information is transmitted between the cradle 1 and the mobile-phone unit 2 via the primary-side transfer coil 10 and the secondary-side transfer coil 14. That is, when charging of the battery 16 is being carried out by transferring power from the cradle 1, the charging control circuit of the mobile-phone unit 2 transfers charging information for the battery 16 to the cradle 1. The control circuit unit 11 of the cradle 1 monitors the charged state of the battery 16 of the mobile-phone unit 2 using the charging information transmitted from the mobile-phone unit 2. On finding from the charging information that the charging of the battery 16 has not been completed, the control circuit unit 11 carries out control so that the transfer of power via the primary-side transfer coil 10 is continued. On the other hand, on finding from the charging information that the charging of the battery 16 has been completed, the control circuit unit 11 carries out control so that the transfer of power is stopped. Aside from such control, the control circuit unit 11 also carries out control to stop the transfer of power when information showing some kind of abnormality has been supplied from the mobile-phone unit 2, for example.

In addition, although the detailed construction and operation will be described later, the mobile-phone unit 2 according to the embodiment also includes a leaking flux detecting coil for detecting leaking magnetic flux. Such leaking magnetic flux is produced due to some of the magnetic flux from the primary-side transfer coil 10 not being received by the secondary-side transfer coil 14, with the center positions of the primary-side transfer coil 10 of the cradle 1 and the secondary-side transfer coil 14 of the mobile-phone unit 2 being displaced, when the mobile-phone unit 2 is placed on the terminal mount of the cradle 1. Also, in the contactless power transferring system according to the embodiment, information showing the output voltage from the leaking flux detecting coil of the mobile-phone unit 2 can be fed back from the mobile-phone unit 2 to the cradle 1. That is, information showing at least a center position displaced distance between the primary-side transfer coil 10 and the secondary-side transfer coil 14 can be fed back via the secondary-side transfer coil 14 and the primary-side transfer coil 10. Also, the cradle 1 according to the embodiment recognizes the center position displaced distance between the primary-side transfer coil 10 and the secondary-side transfer coil 14 based on the information showing the output voltage of the leaking flux detecting coil sent from the mobile-phone unit 2. The cradle 1 according to the embodiment also controls the resonant frequency, resonant voltage, and/or transmission power of the primary-side transfer coil 10 based on the center position displaced distance so that a larger generated voltage is obtained by the secondary-side transfer coil 14 of the mobile-phone unit 2 and the leaking magnetic flux is reduced (i.e., so that the detection voltage of the leaking flux detecting coil is reduced). Accordingly, in the embodiment, it is possible to suppress the generation of heat due to displacement of the coil center positions, to suppress a fall in the transfer efficiency, and to avoid situations where the transfer of power stops due to displacement of the coil center positions.

Figure 2:
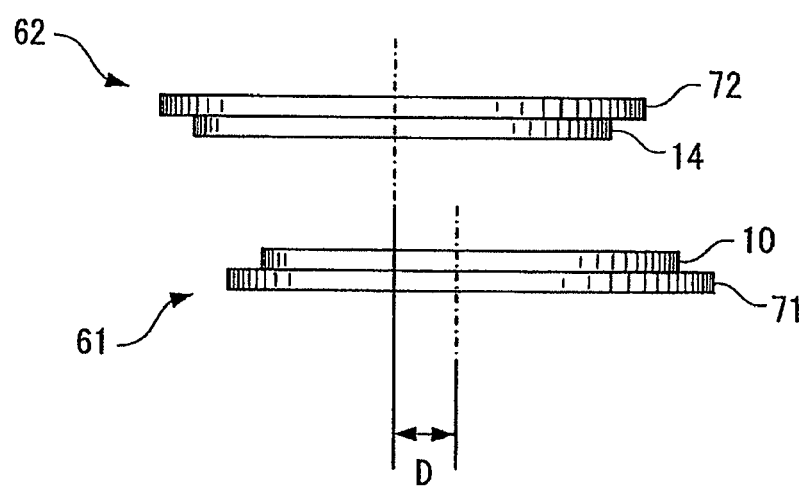
FIG. 2 is a diagram showing one example of how a primary-side transfer coil and a secondary-side transfer coil are disposed when the center positions thereof are displaced.

Relationships Between Displacement of Center Positions of Both Coils and 1. Output of Secondary Coil and 2. Transfer Efficiency FIG. 2 is a schematic view of the primary-side transfer coil 10 and the secondary-side transfer coil 14 for a case where a displacement between the center positions has occurred when the mobile-phone unit 2 according to the embodiment has been placed on the terminal mount of the cradle 1. Note that in the example in FIG. 2, the disposed state of the coils is shown for a case where the center positions are displaced, and the symbol "D" shows the displaced distance for the center positions.

In the embodiment, although not shown in detail in the drawings, the primary-side transfer coil 10 incorporated in the cradle 1 is a flat coil where a single metal wire or twisted metal wire or metal thin-film pattern with an insulating layer provided on the surface thereof is wound in a spiral on a substantially flat plane. One flat surface of the primary-side transfer coil 10 is stuck onto a surface of a flexible printed circuit board or the like. In addition, a magnetic sheet 71 for efficiently forming magnetic paths between the primary-side transfer coil 10 and the secondary-side transfer coil 14 of the mobile-phone unit 2 to increase the flux linkage is stuck to the other flat surface of the primary-side transfer coil 10 so as to entirely cover the other flat surface. The magnetic sheet 71 also suppresses unnecessary radiation due to magnetic fields produced from both coils. Also, although not shown in the drawings, a metal sheet made of aluminum or the like is stuck to the outside of the magnetic sheet 71 as necessary. Note that in the following description, a coil unit including the primary-side transfer coil 10, the magnetic sheet 71, and the like is referred to as the "primary-side coil unit 61".

Similarly, although not shown in detail in the drawings, the secondary-side transfer coil 14 incorporated in the mobile-phone unit 2 is a flat coil where a single metal wire or twisted metal wire or metal thin-film pattern with an insulating layer provided on the surface thereof is wound in a spiral on a substantially flat plane. One flat surface of the secondary-side transfer coil 14 is stuck onto a surface of a flexible printed circuit board or the like. In addition, a magnetic sheet 72 for efficiently forming magnetic paths between the secondary-side transfer coil 14 and the primary-side transfer coil 10 of the cradle 1 to increase the flux linkage is stuck to the other flat surface of the secondary-side transfer coil 14 so as to entirely cover the other flat surface. The magnetic sheet 72 also suppresses unnecessary radiation due to magnetic fields produced from both coils Also, although not shown in the drawings, a metal sheet made of aluminum or the like is stuck to the outside of the magnetic sheet 72 as necessary. Note that in the following description, a coil unit including the secondary-side transfer coil 14, the magnetic sheet 72, and the like is referred to as the "secondary-side coil unit 62".

Here, the mobile-phone unit 2 is placed on the terminal mount of the cradle 1 and the primary-side coil unit 61 is disposed facing the secondary-side coil unit 62 and contactless power transferring is carried out in this state. If both coil center positions of the primary-side transfer coil 10 and the secondary-side transfer coil 14 substantially match (i.e., when the positional displacement is substantially zero), the voltage and current outputted from the secondary-side transfer coil 14 will be substantially equal to the designed values and the power transfer efficiency will be substantially the maximum value.

On the other hand, when both coil center positions are displaced as shown in FIG. 2, the voltage and current outputted from the secondary-side transfer coil 14 both fall, and the power transfer efficiency also falls.

Figure 3:
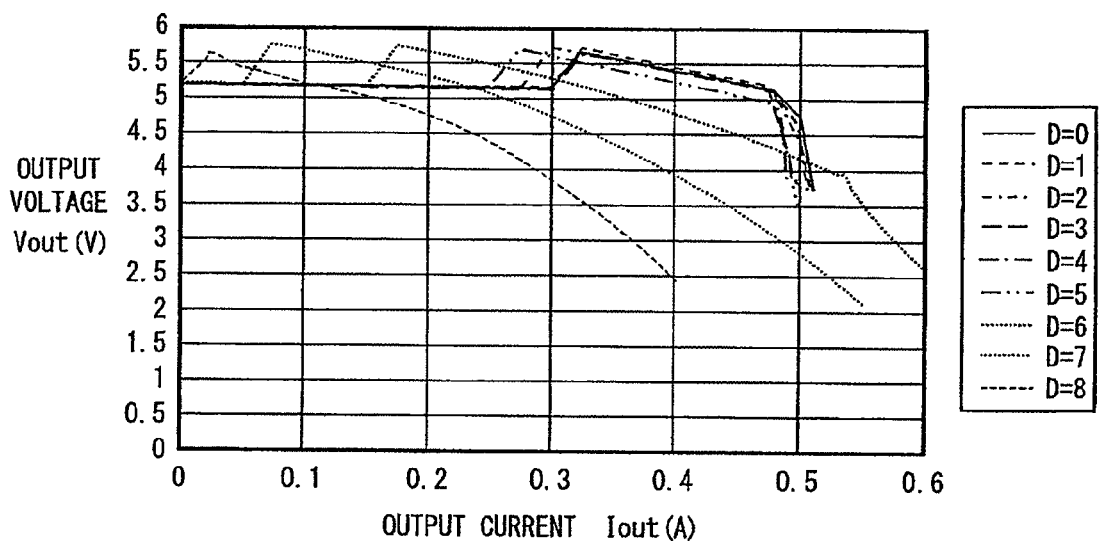
FIG. 3 is a graph showing the relationship between (i) the displacement between the center positions of the primary-side transfer coil and the secondary-side transfer coil and (ii) an output voltage and output current of the secondary-side transfer coil for each positional displacement.

FIG. 3 shows the relationship between displaced distances between the primary-side transfer coil 10 and the secondary-side transfer coil 14 and the output voltage Vout and output current Iout of the secondary-side transfer coil 14 when such displaced distances occur. Note that in FIG. 3, example cases where D=0 (where the displaced distance is 0), D=1 (where the displaced distance is 1 mm), D=2 (where the displaced distance is 2 mm), . . . , D=8 (where the displaced distance is 8 mm) are shown as the displaced distance between the center positions of the coils.

As shown in the example in FIG. 3, when the displaced distance between the center positions of the primary-side transfer coil 10 and the secondary-side transfer coil 14 is in a range of D=0 to D=5, significant deterioration is not observed in the output characteristics (and in particular in the output voltage Vout) from the secondary-side transfer coil 14. However, when the displaced distance between the center positions is D=6 or above, significant deterioration is observed in the output characteristics (in the output voltage Vout) from the secondary-side transfer coil 14. That is, when the center positions of both coils are displaced by a certain amount, there is an increase in the leaking magnetic flux produced, because magnetic flux from the primary-side transfer coil 10 is not all received by the secondary-side transfer coil 14. Therefore, there is a fall in the output voltage of the secondary-side transfer coil 14 corresponding to the amount of such leaking magnetic flux. Note that when the output voltage of the secondary-side transfer coil 14 falls due to the leaking of magnetic flux, if the transferred amount of power from the cradle 1 is increased to compensate for such fall, there will be an increase in the amount of heat generated by the coils.

Figure 4:
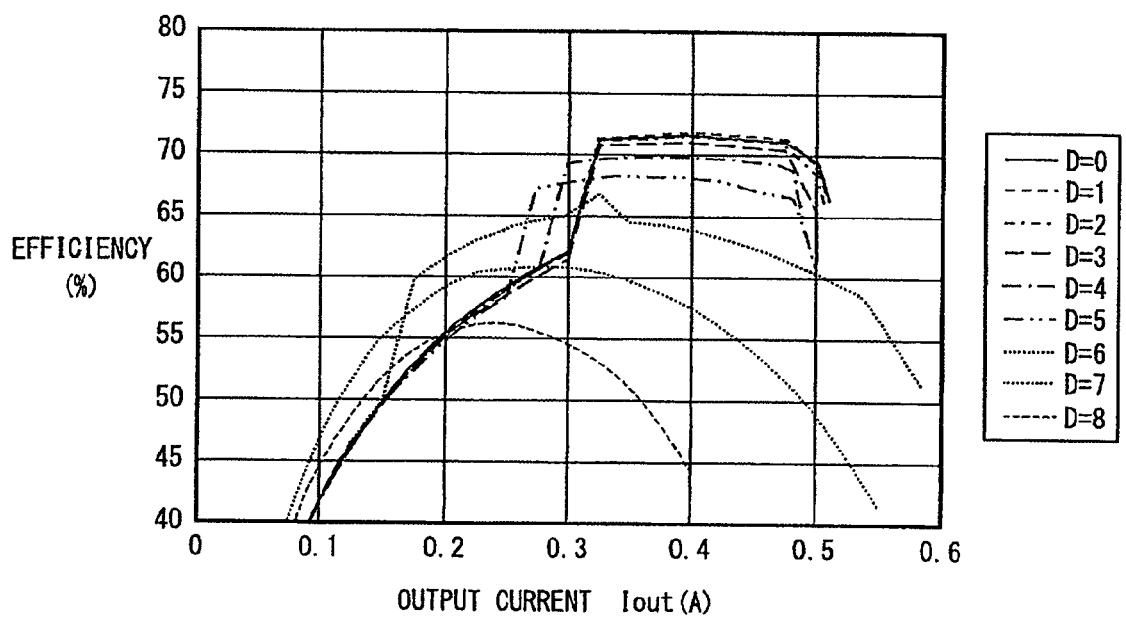
FIG. 4 is a graph showing the relationship between (i) the displacement between the center positions of the primary-side transfer coil and the secondary-side transfer coil and (ii) an output voltage of the secondary-side transfer coil and power transfer efficiency.

FIG. 4 shows the relationship between displaced distances between the center positions of both coils and (1) the output current Iout and (2) the power transfer efficiency (%) of the secondary-side transfer coil 14 for the respective displaced distances. Note that FIG. 4 shows example cases for the same displaced distances between both coils as shown in FIG. 3.

As shown in FIG. 4, when the displaced distance between the center positions of the primary-side transfer coil 10 and the secondary-side transfer coil 14 is small (such as a displaced distance in a range of D=0 to D=5), there is only a small fall in the transfer efficiency when the output current Iout of the secondary-side transfer coil 14 is in a range of 300 mA to 500 mA, for example. However, when the displaced distance between the center positions is large, there will be a fall in the transfer efficiency even when the output current Iout of the secondary-side transfer coil 14 is in the range of 300 mA to 500 mA. On the other hand, as shown in FIG. 4, even when the displaced distance between the coil center positions is of a certain size (for example, when D=6), a fairly sufficient transfer efficiency can be obtained if the output current Iout of the secondary-side transfer coil 14 is in a range of 250 mA to 350 mA, for example.

In other words, when the displacement between the coil center positions is of a certain size, control is carried out to suppress the power transfer from the primary-side transfer coil 10 so that the output current Iout of the secondary-side transfer coil 14 is within a predetermined output current range (that is, a predetermined output power range) such as 250 mA to 350 mA. With such control being carried out, a certain level of transfer efficiency can be maintained. When power transfer from the primary-side transfer coil 10 is suppressed in this way, there is also a reduction in the generation of heat in the coils.

Overview of Detection of Displacement Between Coil Center Positions and Power Transfer Control when Center Positions are Displaced As described earlier, according to the embodiment, when the mobile-phone unit 2 has been placed on the terminal mount of the cradle 1, the displaced distance between the center positions of the primary-side transfer coil 10 and the secondary-side transfer coil 14 is detected. If the detected displaced distance between the center positions is of a certain size, for example, the resonant frequency, resonant voltage, and/or transmitted power of the primary-side transfer coil 10 is/are controlled to control the power transferred from the primary side. Accordingly, a fall in the transfer efficiency and the generation of heat in the coils can be prevented simultaneously.

According to the embodiment, a separate coil (labeled as the "leaking flux detecting coil") is provided outside at least the secondary-side transfer coil 14 and the magnetic sheet 71 that construct the secondary-side coil unit 62 of the mobile-phone unit 2. Magnetic flux from the primary-side transfer coil 10 that could not be received by the secondary-side transfer coil 14 and has leaked to the outside is detected by the leaking flux detecting coil, and the displaced distance between the coil center positions is found based on the output voltage of the leaking flux detecting coil.

That is, when the displaced distance between the center positions of the primary-side transfer coil 10 and the secondary-side transfer coil 14 is large, there is an increase in magnetic flux from the primary-side transfer coil 10 that is not received by the secondary-side transfer coil 14. Accordingly, such magnetic flux leaks to the outside, resulting in more leaking magnetic flux being interlinked with the leaking flux detecting coil and an increase in the output voltage of the leaking flux detecting coil. This means that by studying the relationship between the output voltage of the leaking flux detecting coil and displaced distances between the center positions of both coils that are set in advance, it is possible to calculate the displaced distance between the center positions of both coils. Note that although described later in detail, in the embodiment, information showing the output voltage from the leaking flux detecting coil is transferred from the mobile-phone unit 2 to the cradle 1. Subsequently, the displaced distance between the center positions of the coils is calculated in the cradle 1 based on the output voltage information from the leaking flux detecting coil. It is also possible for the mobile-phone unit 2 to calculate the displaced distance between the center positions of the coils and send information showing such displacement to the cradle 1.

Specific Example of Detection of Displacement Between Coil Center Positions

As shown in FIGS. 5 to 10, according to the embodiment, the mobile-phone unit 2 includes a coil 42, as one example of the leaking flux detecting coil described above, with a diameter that is at least larger than the outer diameters of the secondary-side transfer coil 14 and the magnetic sheet 72.

Figure 5:
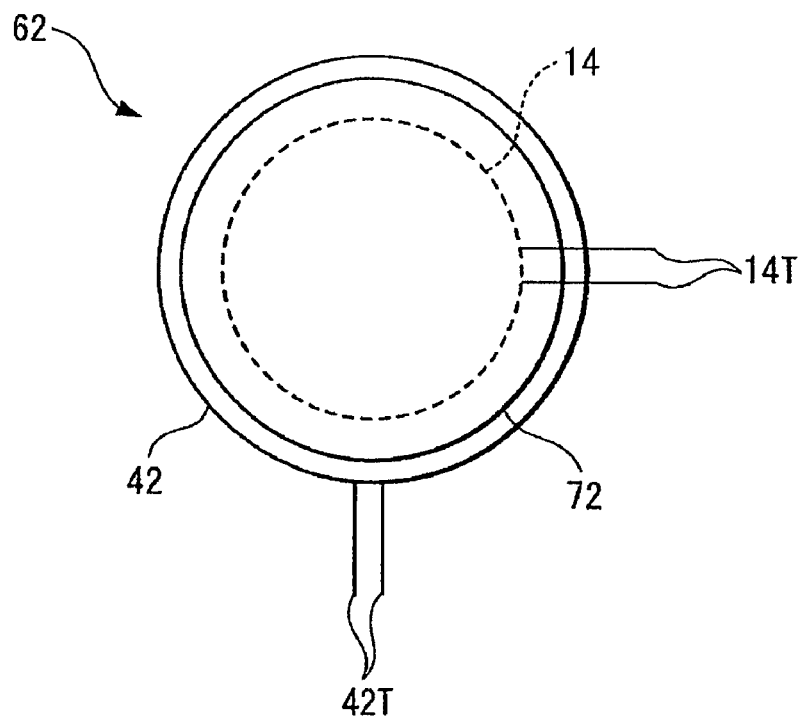
FIG. 5 is a diagram showing only the secondary-side transfer coil, a magnetic sheet, and a leaking flux detecting coil in an outer periphery thereof, out of the component elements of a secondary-side coil unit, when looking from above.
Figure 6:
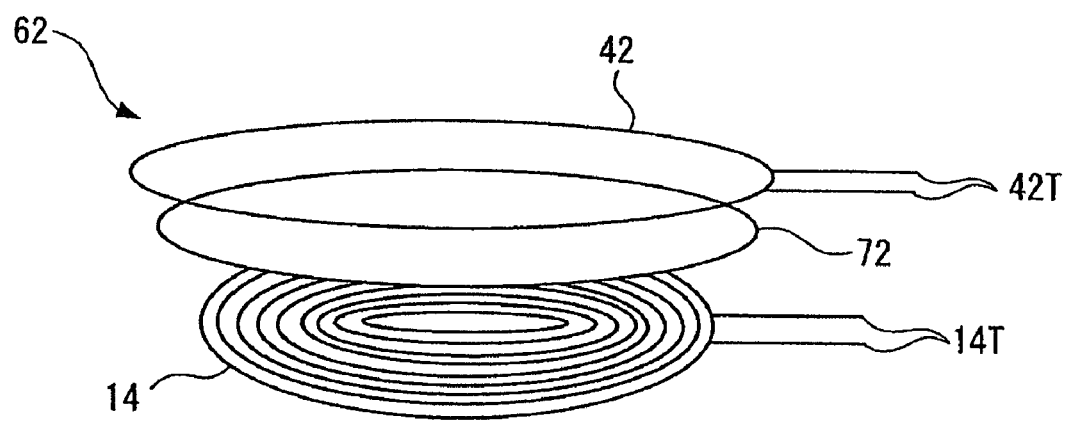
FIG. 6 is an exploded perspective view of the secondary-side coil unit shown in FIG. 5.
Figure 7:
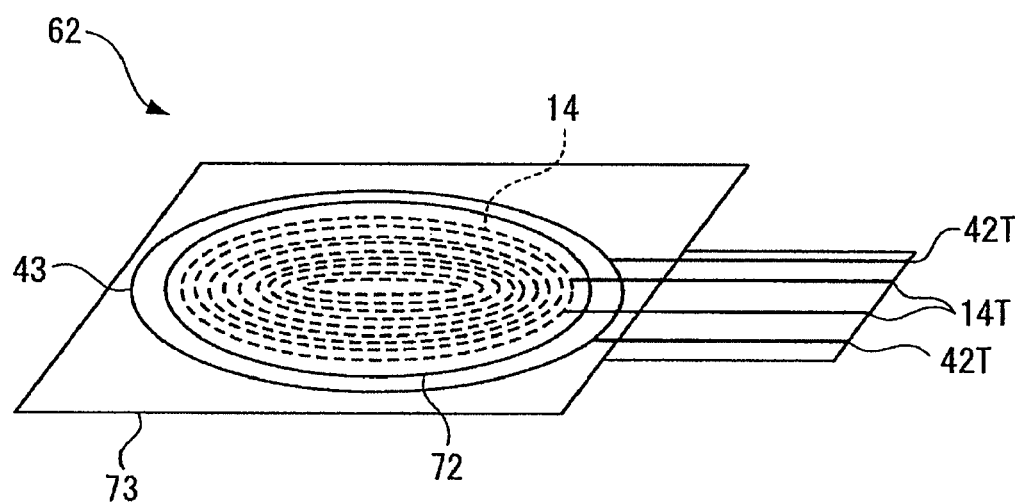
FIG. 7 is a diagram showing one example construction of the secondary-side coil unit where the secondary-side transfer coil, the magnetic sheet, and the leaking flux detecting coil are formed on a flexible printed circuit board.
Figure 8:
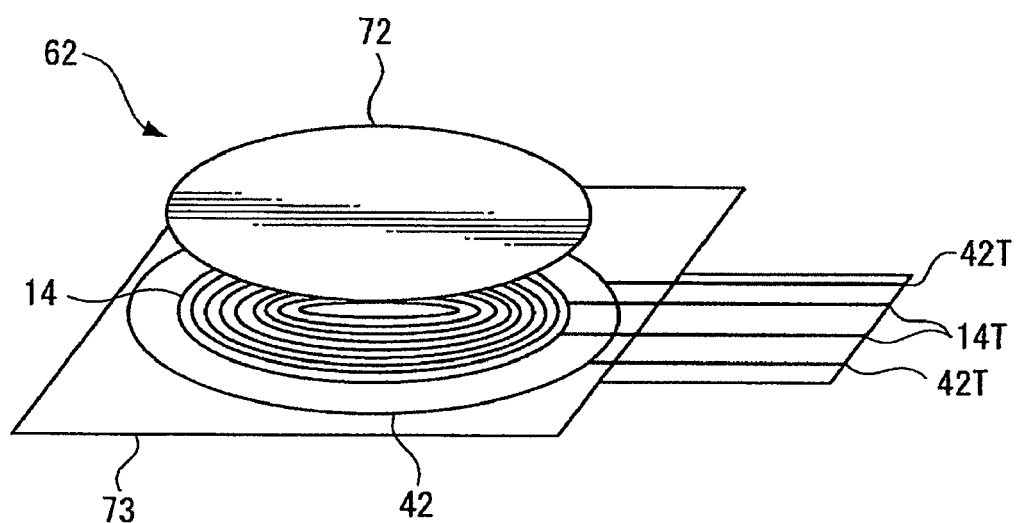
FIG. 8 is an exploded perspective view of the secondary-side coil unit shown in FIG. 7.

FIG. 5 shows one example of the overall construction of the secondary-side transfer coil 14, the magnetic sheet 72, and the leaking flux detecting coil 42, the diameter of which is larger than that of the coil 14 and the sheet 72, among the component elements of the secondary-side coil unit 62, when looking from above. FIG. 6 is an exploded perspective view of the secondary-side coil unit 62 shown in FIG. 5. FIG. 7 shows the overall construction of the secondary-side coil unit 62 where the secondary-side transfer coil 14, the magnetic sheet 72 and the leaking flux detecting coil 42 are formed on a flexible printed circuit board 73, for example, and FIG. 8 is an exploded perspective view showing the secondary-side coil unit 62 shown in FIG. 7. Note that the component elements denoted by the reference numerals 14T in the drawings are coil ends and terminals that extend from the secondary-side transfer coil 14 and the component elements denoted by the reference numerals 42T in the drawings are the coil ends and terminals that extend from the leaking flux detecting coil 42.

As shown in FIGS. 5 to 8, the secondary-side coil unit 62 is formed as follows. Specifically, the secondary-side transfer coil 14 is formed on the flexible printed circuit board 73, for example. Subsequently, the magnetic sheet 72 is stuck to cover the entire surface of the secondary-side transfer coil 14, and the leaking flux detecting coil 42, outer diameter of which is larger than the outer diameters of the secondary-side transfer coil 14 and the magnetic sheet 72, is integrally incorporated on the flexible printed circuit board 73.

Note that although the number of coils for the leaking flux detecting coil 42 is only one in the example shown in FIGS. 5 to 8, an embodiment of the invention is not limited to using a single coil. Also, although a circular shape as shown is preferable as the shape of the leaking flux detecting coil 42 in view of the length (and therefore resistance) of the coiled material, it is also possible to use a non-circular shape, such as when necessary to avoid attachment screws or other components of the coil unit. The center axis of the leaking flux detecting coil 42 may not need to match the center axes of the secondary-side transfer coil 14 and the magnetic sheet 72. However, the center axis of the leaking flux detecting coil 42 may preferably substantially match the center axes of the secondary-side transfer coil 14 and the magnetic sheet 72 so as to prevent changes in the detection voltage of the leaking flux detecting coil 42 when the displaced distance between the center positions of the coils is the same but the direction of displacement differs.

Figure 9:
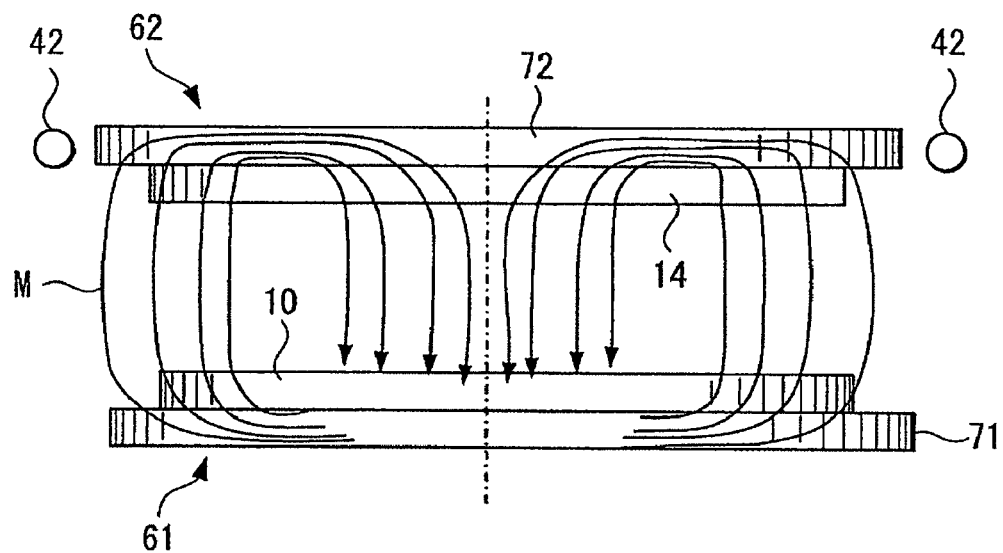
FIG. 9 is a cross-sectional view of a state where the primary-side transfer coil and the secondary-side transfer coil of FIG. 5 are disposed facing one another with center positions thereof substantially matching.
Figure 10:
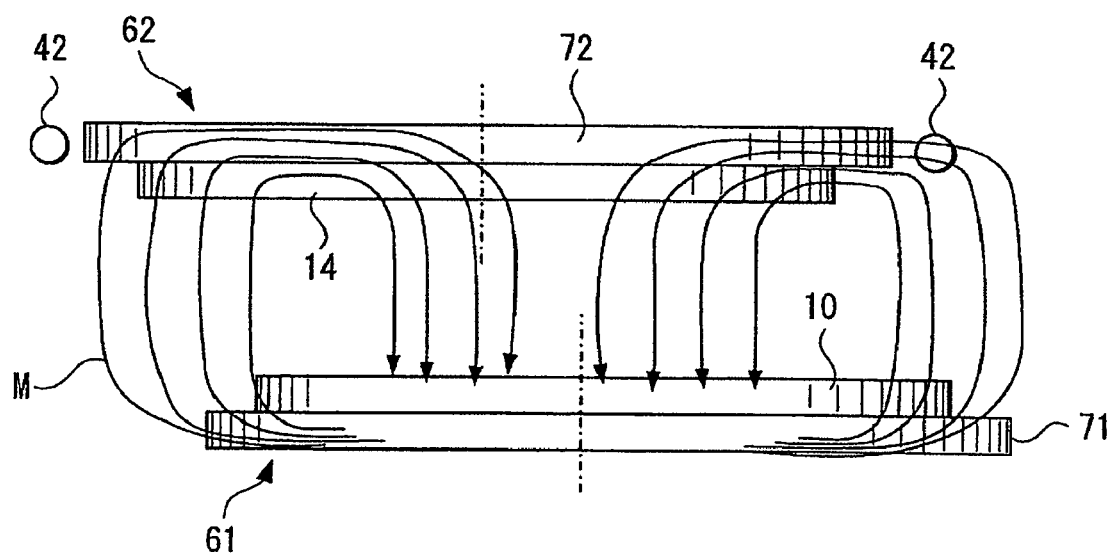
FIG. 10 is a cross-sectional view of a state where the primary-side transfer coil and the secondary-side transfer coil of FIG. 5 are disposed facing one another with center positions thereof displaced.

FIG. 9 is a cross-sectional view of a state where the primary-side coil unit 61 and the secondary-side coil unit 62 have been disposed facing one another in a state where the center positions of the coils substantially match. FIG. 10 is a cross-sectional view of a state where the primary-side coil unit 61 and the secondary-side coil unit 62 have been disposed facing one another in a state where the center positions of the coils are displaced. Note that although the direction of the magnetic flux M is drawn as a single direction in the examples shown in FIGS. 9 and 10 to simplify the drawings, in actuality an AC voltage is used during the transfer of power and therefore the direction of the magnetic flux M is alternately reversed.

As described above, when the center positions of the respective coils substantially match as shown in the example in FIG. 9, the magnetic flux M formed by both coils may not pass the leaking flux detecting coil 42 and a voltage is not generated in the leaking flux detecting coil 42. Conversely, when the center positions of the respective coils are greatly displaced as shown in the example in FIG. 10, the magnetic flux M formed by both coils is interlinked with the leaking flux detecting coil 42 and a voltage is generated in the leaking flux detecting coil 42.

Figure 11:
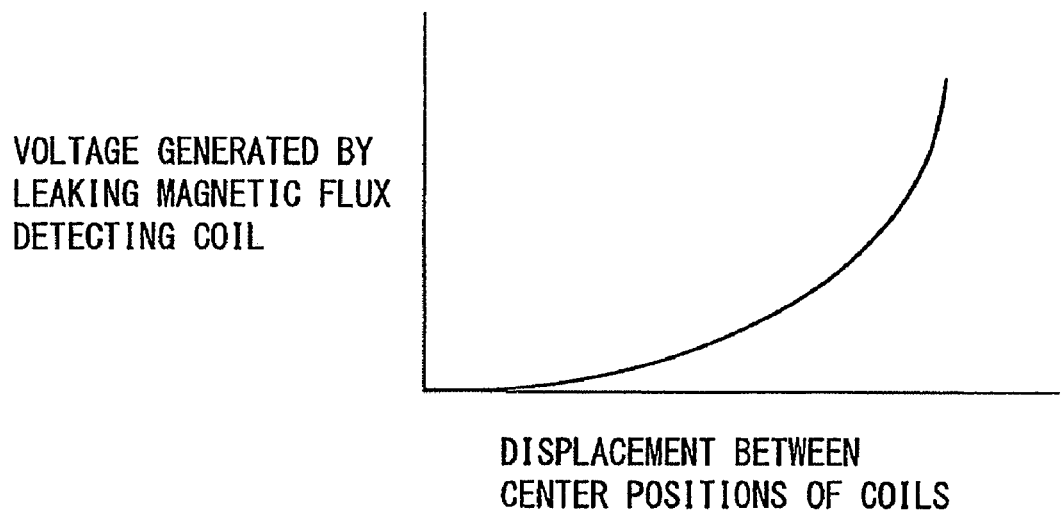
FIG. 11 is a graph showing the relationship between (i) the displacement between the center positions of the primary-side transfer coil and the secondary-side transfer coil of FIG. 5 and (ii) a voltage generated by the leaking flux detecting coil.

FIG. 11 shows the relationship between the displaced distance between the center positions of the coils and the voltage generated by the leaking flux detecting coil. As shown in FIG. 11, when an output voltage is obtained from the leaking flux detecting coil 42, it is possible to determine that there is a displacement between the center positions of the coils, and from the magnitude of the output voltage, it is also possible to calculate the displaced distance between the center positions of the coils.

Note that when the diameter of the primary-side transfer coil 10 is equal to or larger than the diameter of the leaking flux detecting coil 42 for example, even when the center positions of the coils substantially match, a very small amount of magnetic flux M may be interlinked with the leaking flux detecting coil 42 and a small voltage will be generated. However, in such case also, when the center positions of the coils become greatly displaced, for example, there may be an increase in the interlinking of the magnetic flux M with the leaking flux detecting coil 42. Accordingly, as compared to when the center positions of the coils substantially match, a larger voltage may be outputted from the leaking flux detecting coil 42. From this voltage, it is possible to know that the center positions of the coils are displaced and to know what the displaced distance is.

In the above description, as shown in FIGS. 5 to 10, the leaking flux detecting coil 42 with a larger diameter than the outer diameters of the secondary-side transfer coil 14 and the magnetic sheet 72 is given as one example of the leaking flux detecting coil provided in the mobile-phone unit 2. However, as described in FIGS. 12 to 27 for example, a plurality of leaking flux detecting coils 42 may be disposed in the periphery of the outer edges of the secondary-side transfer coil 14 and the magnetic sheet 72.

Figure 12:
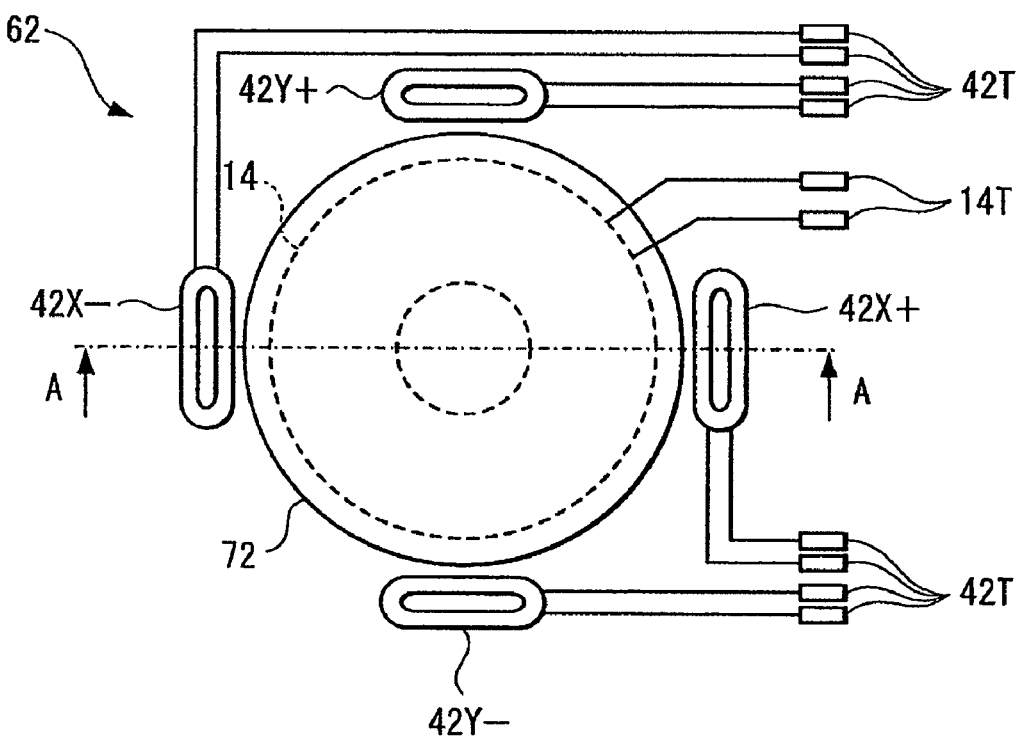
FIG. 12 is a diagram showing only the secondary-side transfer coil, a magnetic sheet, and a plurality of leaking flux detecting coils disposed in an outer periphery thereof, out of the component elements of a secondary-side coil unit, when looking from above.
Figure 13:
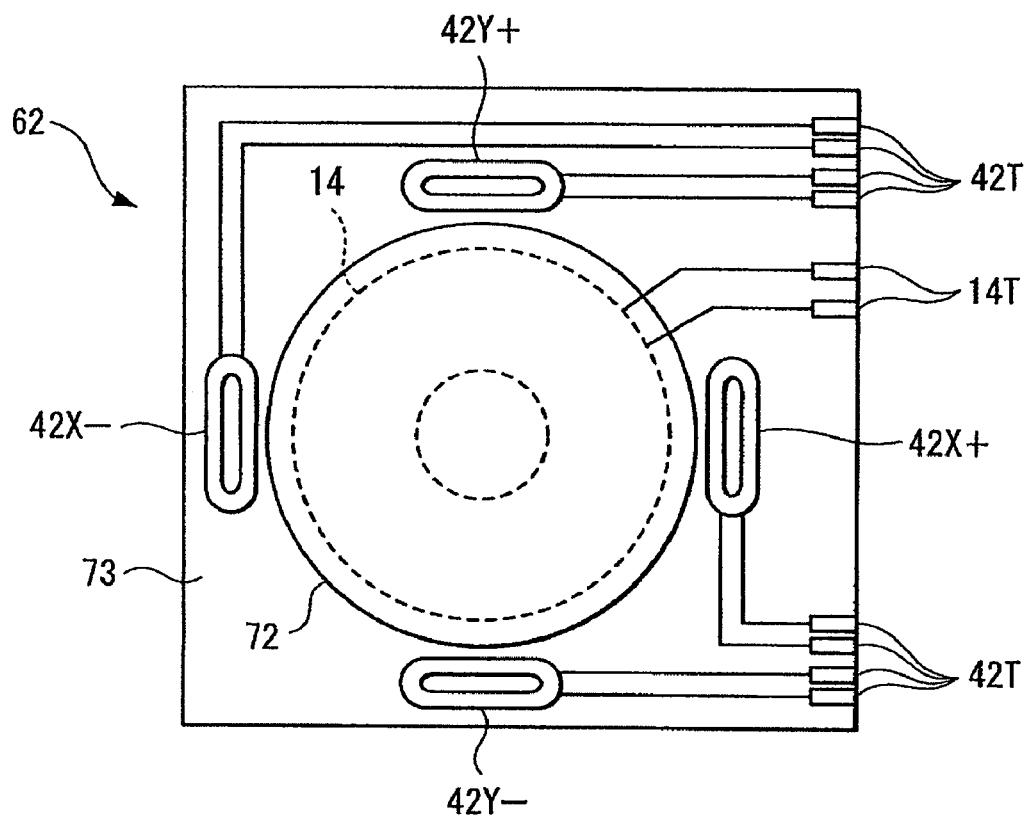
FIG. 13 is a diagram showing an overall construction example of a secondary-side transfer coil unit where the secondary-side transfer coil, the magnetic sheet, and the plurality of leaking flux detecting coils in FIG. 12 are formed on a flexible printed circuit board.

FIG. 12 shows one example of the overall construction of the secondary-side transfer coil 14, the magnetic sheet 72, and leaking flux detecting coils 42Y+, 42Y−, 42X+, and 42X− that are disposed in the periphery of the outer edges of the secondary-side transfer coil 14 and the magnetic sheet 72, among the component elements of the secondary-side coil unit 62 when looking from above. FIG. 13 shows one example of the overall construction of the secondary-side coil unit 62 where the secondary-side transfer coil 14, the magnetic sheet 72, and leaking flux detecting coils 42Y+, 42Y−, 42X+, and 42X− have been formed on the flexible printed circuit board 73, for example. Note that the component elements denoted by the reference numerals 14T in the drawings are the coil ends and terminals that extend from the secondary-side transfer coil 14 and the component elements denoted by the reference numerals 42T in the drawings are the coil ends and terminals that extend from the leaking flux detecting coils 42.

As shown in FIGS. 12 and 13, in the secondary-side coil unit 62, the secondary-side transfer coil 14 is formed on the flexible printed circuit board 73, for example, and the magnetic sheet 72 is stuck on so as to cover the entire surface of the secondary-side transfer coil 14. In addition, small leaking flux detecting coils 42Y+, 42Y−, 42X+, and 42X−, which are disposed in the periphery of the outer edges of the secondary-side transfer coil 14 and the magnetic sheet 72, are formed at four positions and integrally incorporated onto the flexible printed circuit board 73. The four positions correspond to four directions on at least X and Y axes relative to the center axis of the secondary-side transfer coil 14.

Note that although in the example shown in FIGS. 12 and 13, each of the small leaking flux detecting coils 42Y+, 42Y−, 42X+, and 42X− has a structure of winding only twice, an embodiment of the invention is not limited thereto and the number of leaking flux detecting coils is also not limited to four coils. However, it is preferable to dispose at least four leaking flux detecting coils at the positions shown in FIGS. 12 and 13 to make it possible to detect the direction of the displacement in the center positions of the coils as described later. In addition, the shape of the respective leaking flux detecting coils 42 is not limited to an oval shape as shown in the drawings and may be circular or another shape. Also, the distances from the outer edges of the secondary-side transfer coil 14 and the magnetic sheet 72 to the respective leaking flux detecting coils 42Y+, 42Y−, 42X+, and 42X− may not need to match. However, to make it easy to understand the correspondence between the distances from the outer edges of the secondary-side transfer coil 14 and the magnetic sheet 72 to the respective leaking flux detecting coils and the displaced distances between the coil centers, it is preferable for the respective distances to substantially match.

Figure 14:
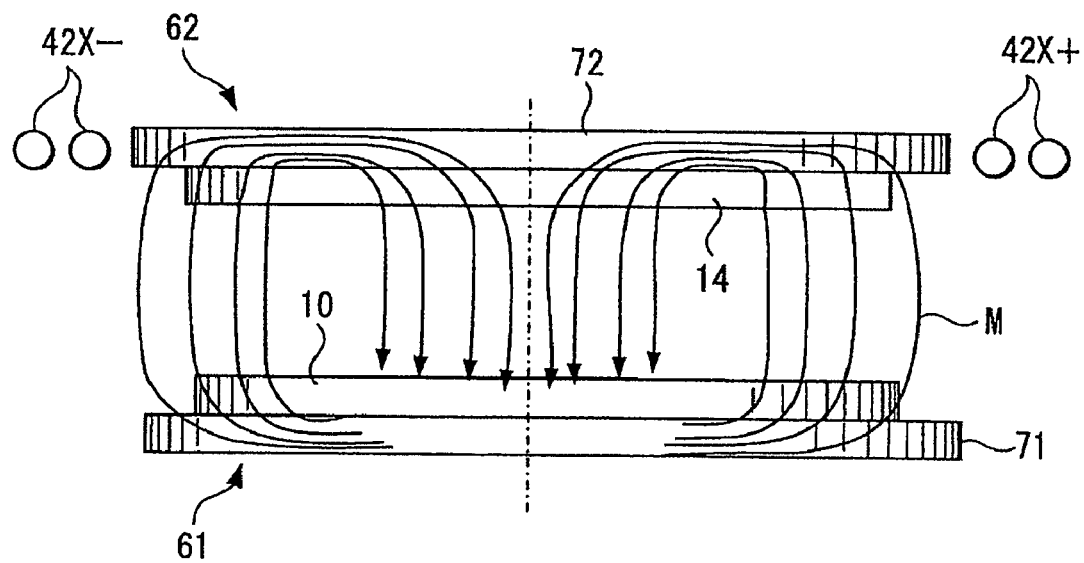
FIG. 14 is a cross-sectional view of the primary-side coil unit and the secondary-side coil unit in FIG. 12 that have been disposed facing one another with the center positions of the coils substantially matching.

FIG. 14 is a cross-sectional view of a case where the primary-side coil unit 61 and the secondary-side coil unit 62 have been disposed facing one another with the center positions of the coils substantially matching, where both coil units have been cut along the dot-dash line A-A in FIG. 12. Note that although the direction of the magnetic flux M is drawn as a single direction in the example in FIG. 14 to simplify the drawing, in actuality an AC voltage is used during the transfer of power and therefore the direction of the magnetic flux M is alternately reversed.

Figure 15:
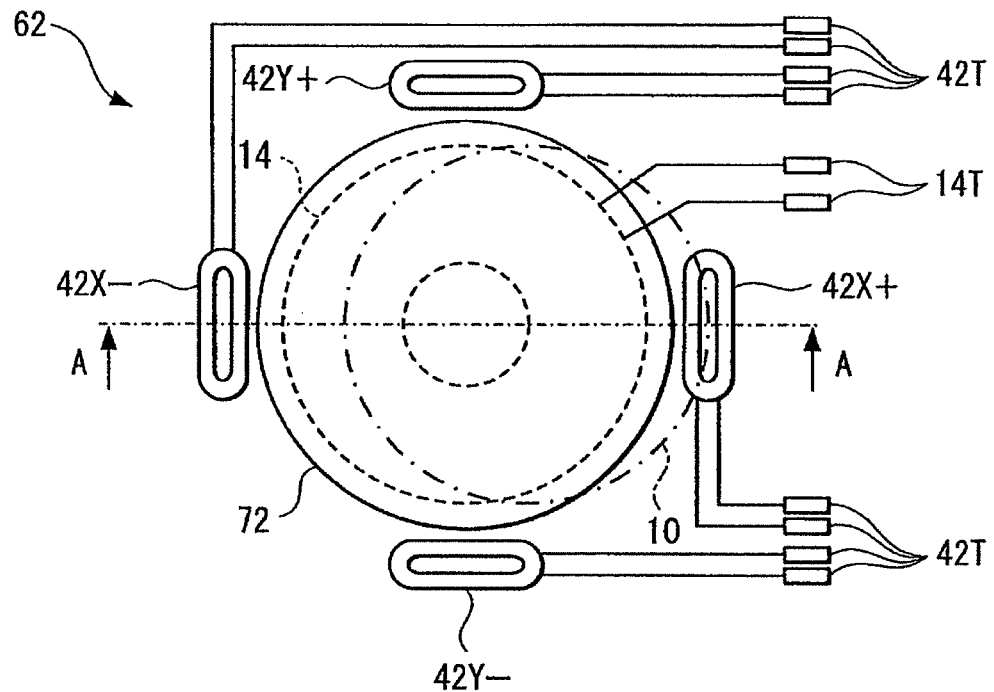
FIG. 15 is a diagram showing one example of the positional relationship between the primary-side transfer coil and the secondary-side transfer coil in a state where the center positions of the primary-side transfer coil and the secondary-side transfer coil in FIG. 12 are displaced.
Figure 16:
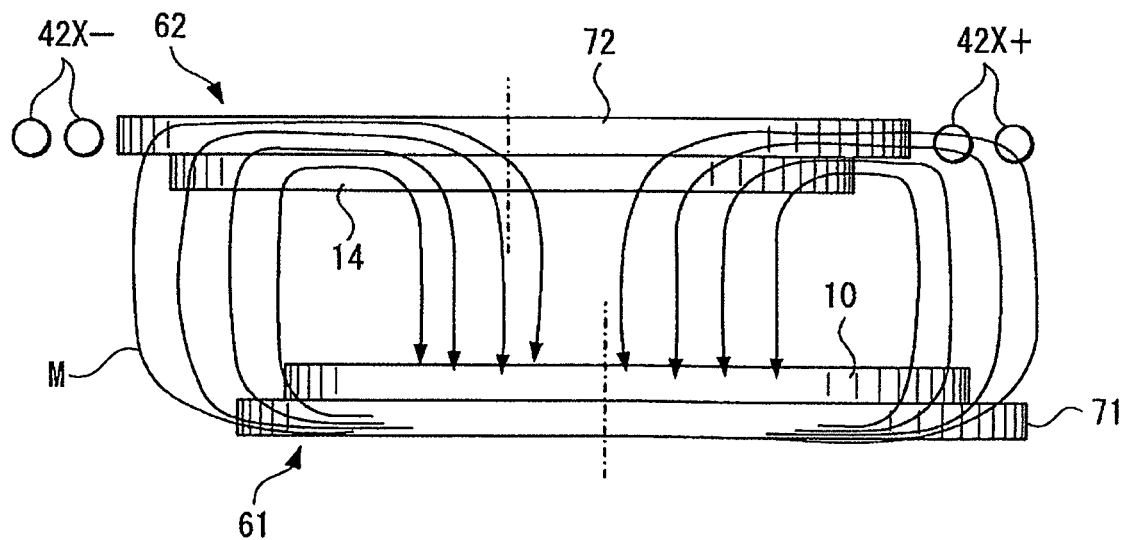
FIG. 16 is a cross-sectional view of the primary-side coil unit and the secondary-side coil unit shown in FIG. 12 in a state where the center positions of the coils are displaced.

FIG. 15 shows one example of the positional relationship between the primary-side transfer coil 10 and the secondary-side transfer coil 14 when the center positions of the primary-side coil unit 61 and the secondary-side coil unit 62 are displaced. FIG. 16 is a cross-sectional view of the primary-side coil unit 61 and the secondary-side coil unit 62 in a state where the coil units have been disposed facing one another with the coil center positions displaced as shown in FIG. 15. Note that although, the direction of the magnetic flux M is drawn as a single direction in the example in FIG. 16, in actuality during the transfer of power, the direction of the magnetic flux M is alternately reversed.

As described above, when the center positions of both coils substantially match in the example as shown in FIG. 14, the magnetic flux M formed by both coils may not pass the leaking flux detecting coils 42Y+, 42Y−, 42X+, and 42X− and accordingly a voltage is not generated in any of the leaking flux detecting coils 42Y+, 42Y−, 42X+, and 42X−. On the other hand, when the center positions of both coils are greatly displaced as shown in the examples in FIGS. 15 and 16, the magnetic flux M formed by both coils is interlinked with one or more of the leaking flux detecting coils 42Y+, 42Y−, 42X+, and 42X−. Therefore, a voltage is generated in such leaking flux detecting coils that are interlinked with the magnetic flux M. Accordingly, when an output voltage or voltages are obtained due to interlinkage of the magnetic flux M with one or more of the leaking flux detecting coils 42Y+, 42Y−, 42X+, and 42X−, it is determined that a positional displacement has occurred between both coils, and from the magnitude(s) of the output voltage(s) of such coils, the displaced distance in the center positions of the coils can be calculated. At the same time, by obtaining output voltages from the leaking flux detecting coils 42Y+, 42Y−, 42X+, and 42X, it is possible to calculate the direction of the displacement in the center positions of the coils. In addition, in this example, since detection voltages that are substantially in proportion to the displaced distance between the center positions of the coils are obtained from the respective leaking flux detecting coils, it is possible to determine the displaced distance more accurately.

Note that when the diameter of the primary-side transfer coil 10 is equal to or larger than the disposed positions of the leaking flux detecting coils 42Y+, 42Y−, 42X+, and 42X−, even when the center positions of both coils substantially match, a very small amount of magnetic flux M may be interlinked with the leaking flux detecting coils 42Y+, 42Y−, 42X+, and 42X− and a small voltage or voltages will be generated. However, in such case also, when the center positions of both coils become greatly displaced, for example, there may be an increase in the interlinking of the magnetic flux M with the leaking flux detecting coils 42Y+, 42Y−, 42X+, and 42X−. Accordingly, as compared to when the center positions of the coils substantially match, a larger voltage may be outputted from one or more of the leaking flux detecting coils 42Y+, 42Y−, 42X+, and 42X− and/or conversely there may be one or more leaking flux detecting coils from which an output voltage is no longer obtained. Accordingly, from such voltages, it is possible to know that the center positions of the coils are displaced and to also know the displaced distance and the displacement direction.

The relationship between the displaced distance and the displacement direction for the center positions of the coils and the output voltages of the leaking flux detecting coils 42Y+, 42Y−, 42X+, and 42X− will now be described with reference to FIGS. 17 to 28.

Figure 17:
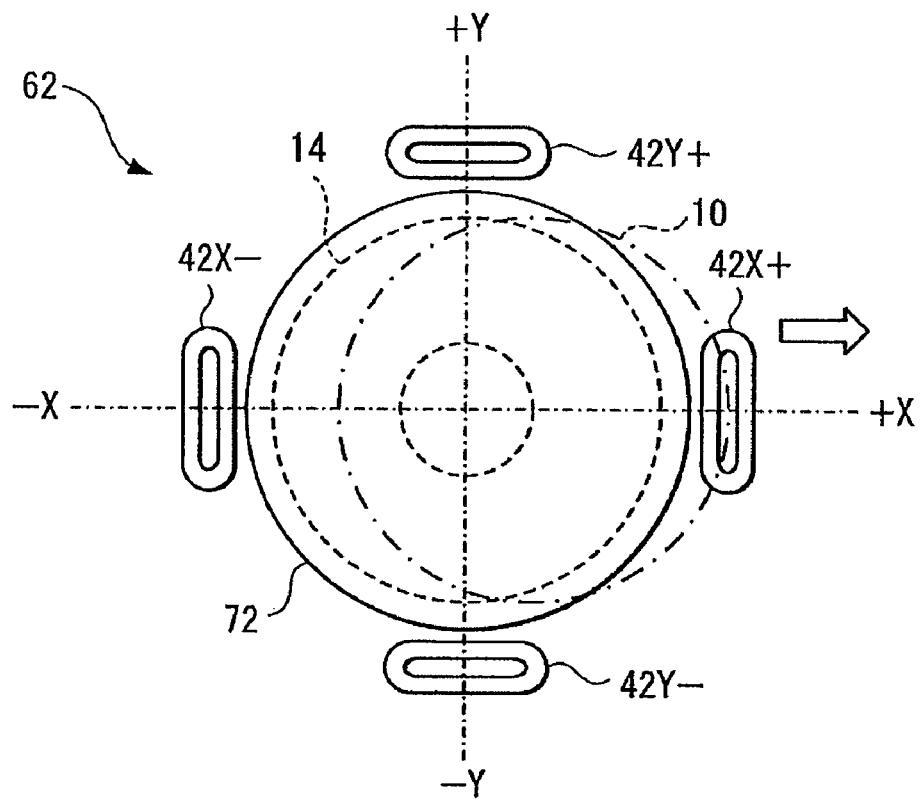
FIG. 17 is a diagram showing one example of the displacement between the center positions of the coils when the primary-side transfer coil has been displaced relative to the secondary-side transfer coil in FIG. 12 in the "X+" direction.
Figure 18:
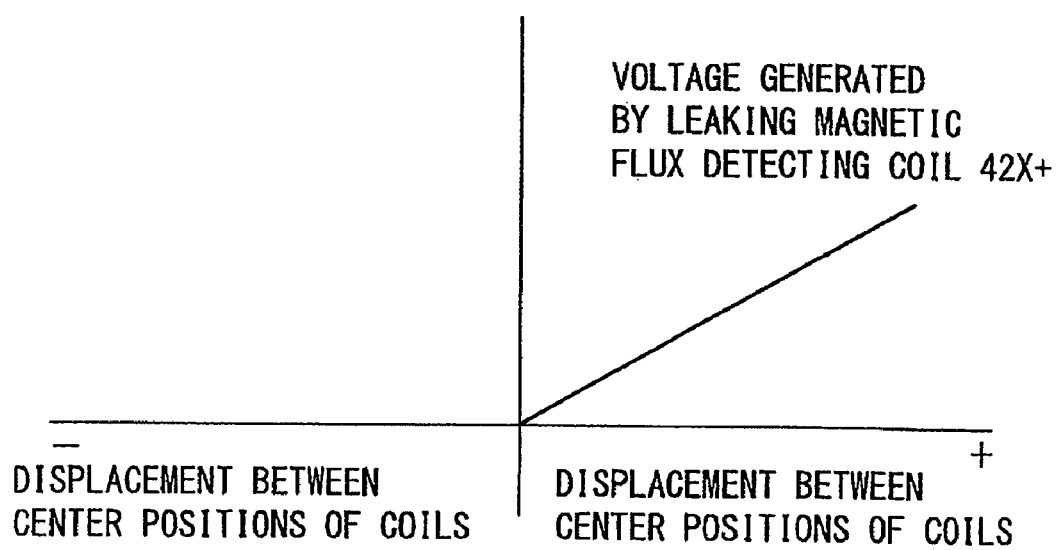
FIG. 18 is a graph showing the relationship between (i) the displaced distance and displacement direction for the center positions of the coils in FIG. 17 and (ii) output voltages of the respective leaking flux detecting coils.

FIGS. 17 and 18 show the relationship between the displacement between the center positions of the coils when the primary-side transfer coil 10 is displaced relative to the secondary-side transfer coil 14 in the direction shown by the arrow in FIG. 17 (the "+X" direction) and the output voltages of the leaking flux detecting coils. As shown in the example in FIGS. 17 and 18, when the primary-side transfer coil 10 is displaced relative to the secondary-side transfer coil 14 in the "+X" direction, out of the leaking flux detecting coils 42Y+, 42Y−, 42X+, and 42X−, a voltage is generated from only the leaking flux detecting coil 42X+. As the displaced distance becomes larger, the voltage generated from the leaking flux detecting coil 42X+ also increases. Accordingly, when an output voltage is obtained as shown in FIG. 18, it is possible to determine that the primary-side transfer coil 10 is displaced relative to the secondary-side transfer coil 14 in the direction of the arrow in FIG. 17 (i.e., the "+X" direction) and the displaced distance can be calculated from the magnitude of such output voltage.

Figures 19, 20:
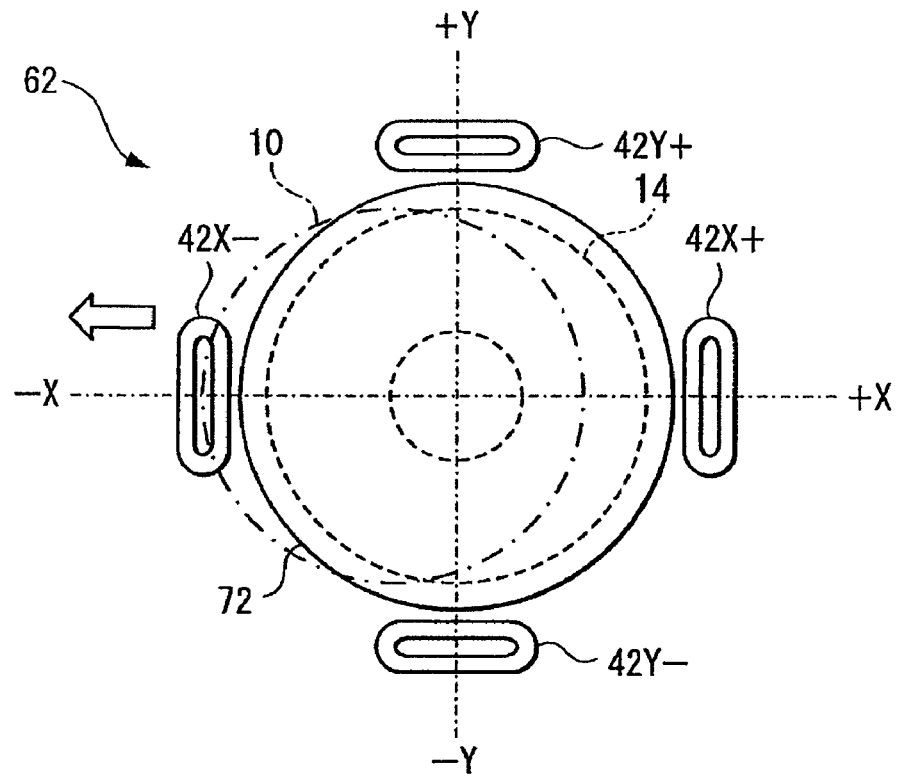
FIG. 19 is a diagram showing one example of the displacement between the center positions of the coils when the primary-side transfer coil has been displaced relative to the secondary-side transfer coil in FIG. 12 in the "X−" direction.
FIG. 20 is a graph showing the relationship between (i) the displaced distance and displacement direction for the center positions of the coils in FIG. 19 and (ii) output voltages of the respective leaking flux detecting coils.

FIGS. 19 and 20 show the relationship between the displacement between the center positions of the coils when the primary-side transfer coil 10 is displaced relative to the secondary-side transfer coil 14 in the direction shown by the arrow in FIG. 19 (the "−X" direction) and the output voltages of the leaking flux detecting coils. As shown in the example in FIGS. 19 and 20, when the primary-side transfer coil 10 is displaced relative to the secondary-side transfer coil 14 in the "−X" direction, a voltage is generated from only the leaking flux detecting coil 42X−. As the displaced distance becomes larger, the voltage generated from the leaking flux detecting coil 42X− also increases. Accordingly, when the output voltages are obtained as shown in FIG. 20, it is possible to determine that the primary-side transfer coil 10 is displaced relative to the secondary-side transfer coil 14 in the direction of the arrow in FIG. 19 (i.e., the "−X" direction) and the displaced distance can be calculated from the magnitudes of the output voltages.

Figures 21, 22:
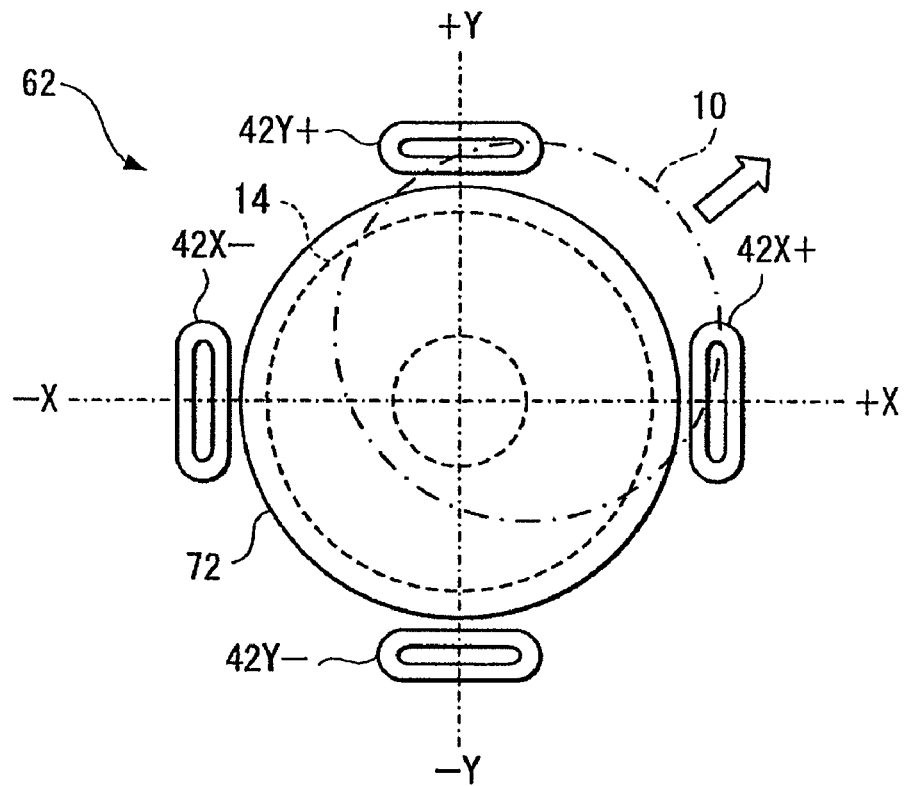
FIG. 21 is a diagram showing one example of the displacement between the center positions of the coils when the primary-side transfer coil has been displaced relative to the secondary-side transfer coil in FIG. 12 in a diagonal direction substantially midway between the "+Y" and "+X" directions.
FIG. 22 is a graph showing the relationship between (i) the displaced distance and displacement direction for the center positions of the coils in FIG. 21 and (ii) output voltages of the respective leaking flux detecting coils.

FIGS. 21 and 22 show the relationship between the displacement between the center positions of the coils when the primary-side transfer coil 10 is displaced relative to the secondary-side transfer coil 14 in the direction shown by the arrow in FIG. 21 (a diagonal direction substantially midway between the "+Y" and "+X" directions) and the output voltages of the leaking flux detecting coils. As shown in the example in FIGS. 21 and 22, when the primary-side transfer coil 10 is displaced relative to the secondary-side transfer coil 14 in a diagonal direction substantially midway between the "+Y" and "+X" directions, substantially equal voltages are generated from the leaking flux detecting coils 42Y+ and 42X+. As the displaced distance becomes larger, the voltages generated from the leaking flux detecting coils 42Y+ and 42+ also increase. Accordingly, when the output voltages are obtained as shown in FIG. 22, it is possible to determine that the primary-side transfer coil 10 is displaced relative to the secondary-side transfer coil 14 in the direction of the arrow in FIG. 21 (i.e., the diagonal direction substantially midway between the "+Y" and "+X" directions) and the displaced distance can be calculated from the magnitudes of the output voltages.

Figures 23, 24:
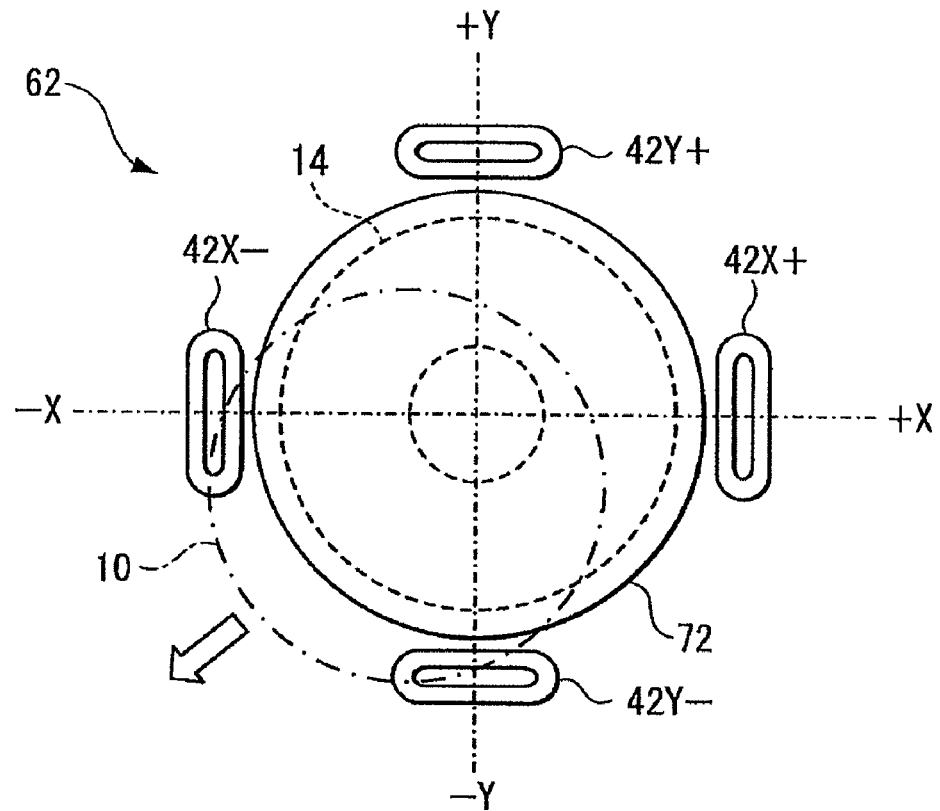
FIG. 23 is a diagram showing one example of the displacement between the center positions of the coils when the primary-side transfer coil has been displaced relative to the secondary-side transfer coil in FIG. 12 in a diagonal direction substantially midway between the "−Y" and "−X" directions.
FIG. 24 is a graph showing the relationship between (i) the displaced distance and displacement direction for the center positions of the coils in FIG. 23 and (ii) output voltages of the respective leaking flux detecting coils.

FIGS. 23 and 24 show the relationship between the displacement between the center positions of the coils when the primary-side transfer coil 10 is displaced relative to the secondary-side transfer coil 14 in the direction shown by the arrow in FIG. 23 (a diagonal direction substantially midway between the "−Y" and "−X" directions) and the output voltages of the leaking flux detecting coils. As shown in the example in FIGS. 23 and 24, when the primary-side transfer coil 10 is displaced relative to the secondary-side transfer coil 14 in a diagonal direction substantially midway between the "−Y" and "−X" directions, substantially equal voltages are generated from the leaking flux detecting coils 42Y− and 42X−. As the displaced distance becomes larger, the voltages generated from the leaking flux detecting coils 42Y− and 42− also increase. Accordingly, when the output voltages are obtained as shown in FIG. 24, it is possible to determine that the primary-side transfer coil 10 is displaced relative to the secondary-side transfer coil 14 in the direction of the arrow in FIG. 23 (i.e., the diagonal direction substantially midway between the "−Y" and "−X" directions) and the displaced distance can be calculated from the magnitudes of the output voltages.

Figure 25:
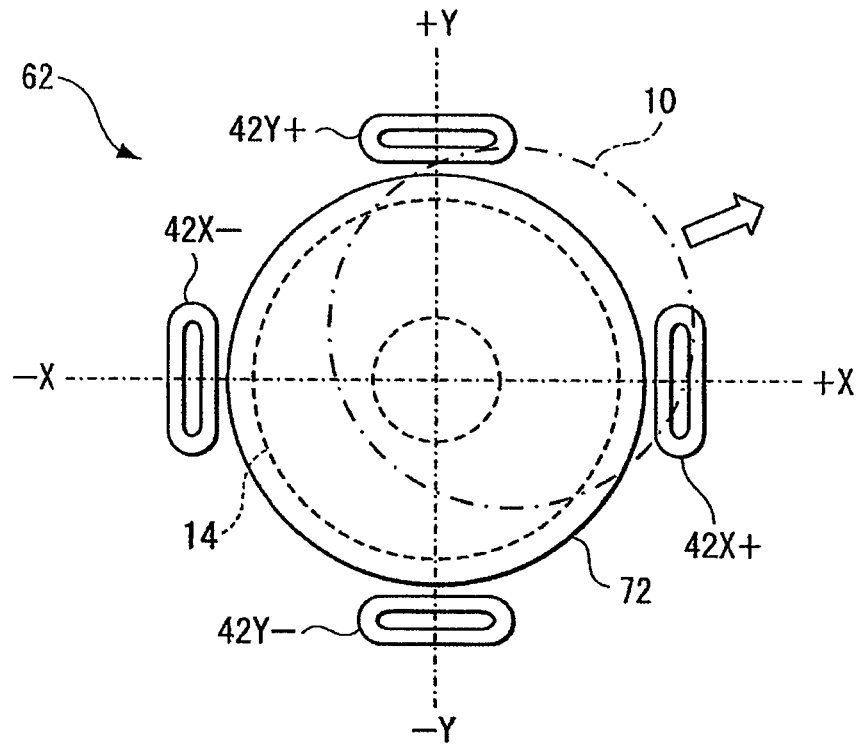
FIG. 25 is a diagram showing one example of the displacement between the center positions of the coils when the primary-side transfer coil has been displaced relative to the secondary-side transfer coil in FIG. 12 in a diagonal direction between the "+Y" and "+X" directions and somewhat closer to the "+X" direction.
Figure 26:
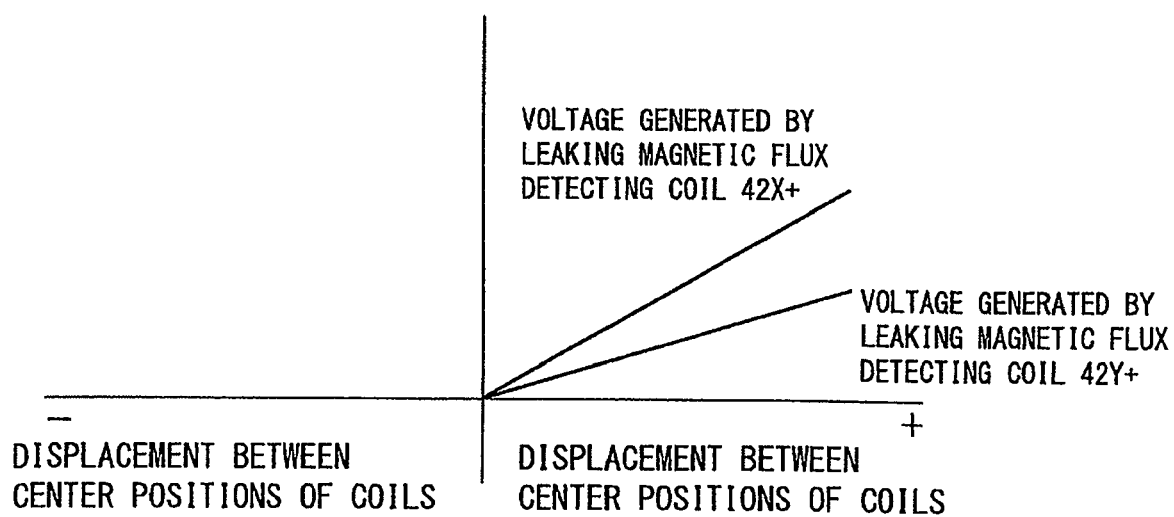
FIG. 26 is a graph showing the relationship between (i) the displaced distance and displacement direction between the center positions of the coils in FIG. 25 and (ii) output voltages of the respective leaking flux detecting coils.

FIGS. 25 and 26 show the relationship between the displacement between the center positions of the coils when the primary-side transfer coil 10 is displaced relative to the secondary-side transfer coil 14 in the direction shown by the arrow in FIG. 25 (a diagonal direction between the "+Y" and "+X" directions and somewhat closer to the "+X" direction) and the output voltages of the leaking flux detecting coils. As shown in the example in FIGS. 25 and 26, the primary-side transfer coil 10 is displaced relative to the secondary-side transfer coil 14 in a diagonal direction between the "+Y" and "+X" directions and somewhat closer to the "+X" direction. In this regard, voltages are generated from the leaking flux detecting coils 42Y+ and 42X+, with the output voltage from the leaking flux detecting coil 42X+ being larger. As the displaced distance becomes larger, the voltages generated from the leaking flux detecting coils 42Y+ and 42+ also increase. Accordingly, when the output voltages are obtained as shown in FIG. 26, it is possible to determine that the primary-side transfer coil 10 is displaced relative to the secondary-side transfer coil 14 in the direction of the arrow in FIG. 25 (i.e., the diagonal direction between the "+Y" and "+X" directions and somewhat closer to the "+X" direction) and the displaced distance can be calculated from the magnitudes of the output voltages.

Figure 27:
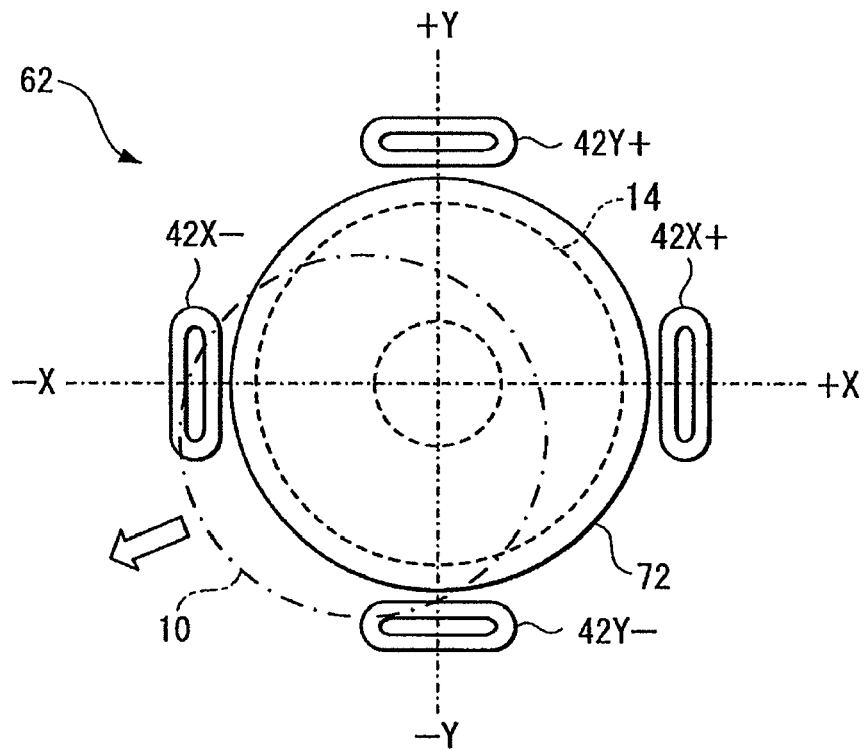
FIG. 27 is a diagram showing one example of the displacement between the center positions of the coils when the primary-side transfer coil has been displaced relative to the secondary-side transfer coil in FIG. 12 in a diagonal direction between the "−Y" and "−X" directions and somewhat closer to the "−X" direction.
Figure 28:
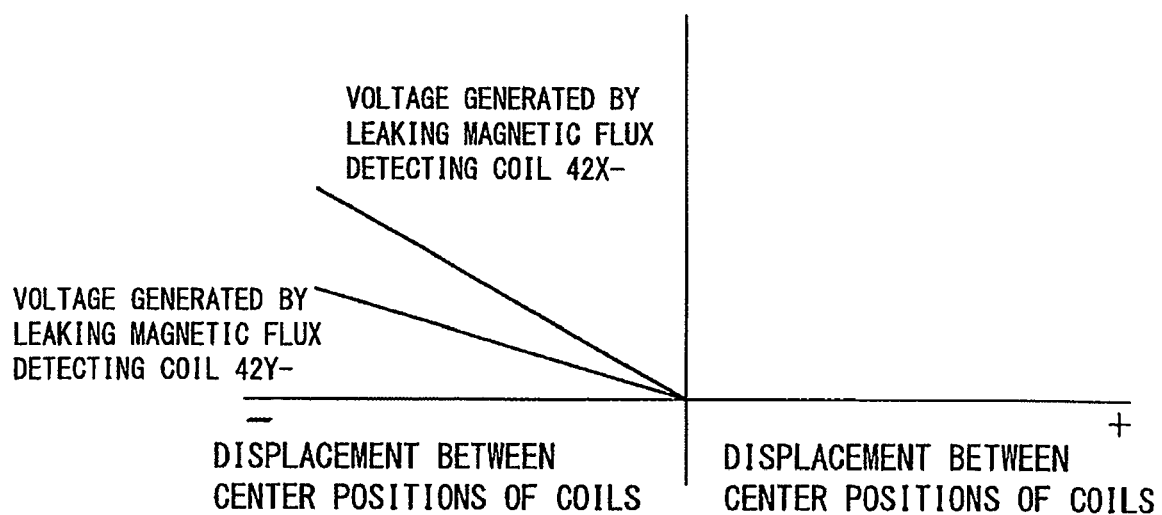
FIG. 28 is a graph showing the relationship between (i) the displaced distance and displacement direction between the center positions of the coils in FIG. 27 and (ii) output voltages of the respective leaking flux detecting coils.

FIGS. 27 and 28 show the relationship between the displacement between the center positions of the coils when the primary-side transfer coil 10 is displaced relative to the secondary-side transfer coil 14 in the direction shown by the arrow in FIG. 27 (a diagonal direction between the "−Y" and "−X" directions and somewhat closer to the "−X" direction) and the output voltages of the leaking flux detecting coils. As shown in the example in FIGS. 27 and 28, the primary-side transfer coil 10 is displaced relative to the secondary-side transfer coil 14 in a diagonal direction between the "−Y" and "−X" directions and somewhat closer to the "−X" direction. In this regard, voltages are generated from the leaking flux detecting coils 42Y− and 42X−, with the output voltage from the leaking flux detecting coil 42X− being larger. As the displaced distance becomes larger, the voltages generated from the leaking flux detecting coils 42Y− and 42− also increase. Accordingly, when the output voltages are obtained as shown in FIG. 28, it is possible to determine that the primary-side transfer coil 10 is displaced relative to the secondary-side transfer coil 14 in the direction of the arrow in FIG. 27 (i.e., the diagonal direction between the "−Y" and "−X" directions and somewhat closer to the "−X" direction) and the displaced distance can be calculated from the magnitudes of the output voltages.

Note that the relationship between the displacement between the center positions of the coils in other directions than the above-described directions and the output voltages of the leaking flux detecting coils is similar to the above and therefore, description thereof is omitted.

Details of Power Transfer Control Based on Detected Displacement of Center Positions and Circuit Configuration According to the embodiment, a displacement between the center positions of the coil and the displaced distance and/or displacement direction have been detected by the mobile-phone unit 2 as described above. Subsequently, information showing the displacement between the center positions of the coils (for example, information showing the output voltages of the leaking flux detecting coils) is transmitted from the mobile-phone unit 2 to the cradle 1. In addition, control that changes the resonant frequency, resonant voltage, and/or transmitted power for example is carried out at the cradle 1 to control the transfer of power from the primary side.

That is, based on the information showing the displacement of the center positions of the coils sent from the mobile-phone unit 2, the cradle 1 carries out control that changes the capacitance C of a capacitor and/or the inductance of a coil that construct a resonance circuit of the primary-side transfer coil 10. As a result, the resonant frequency and the resonant voltage of the primary-side transfer coil 10 may be changed, and/or the transmitted power sent from the primary-side transfer coil 10 may be changed. Accordingly, when the center positions of the coils are displaced, the power transferred from the primary-side transfer coil 10 is suppressed and as a result it is possible to carry out contactless power transferring while maintaining a certain level of transfer efficiency and to simultaneously reduce the generation of heat.

FIGS. 29 to 32 are diagrams showing the internal circuit configurations of the principal parts related to contactless power transferring by the mobile-phone unit 2 and the cradle 1 according to the embodiment and to power transfer control in response to the detection of a displacement between the center positions of the coils.

Figure 29:
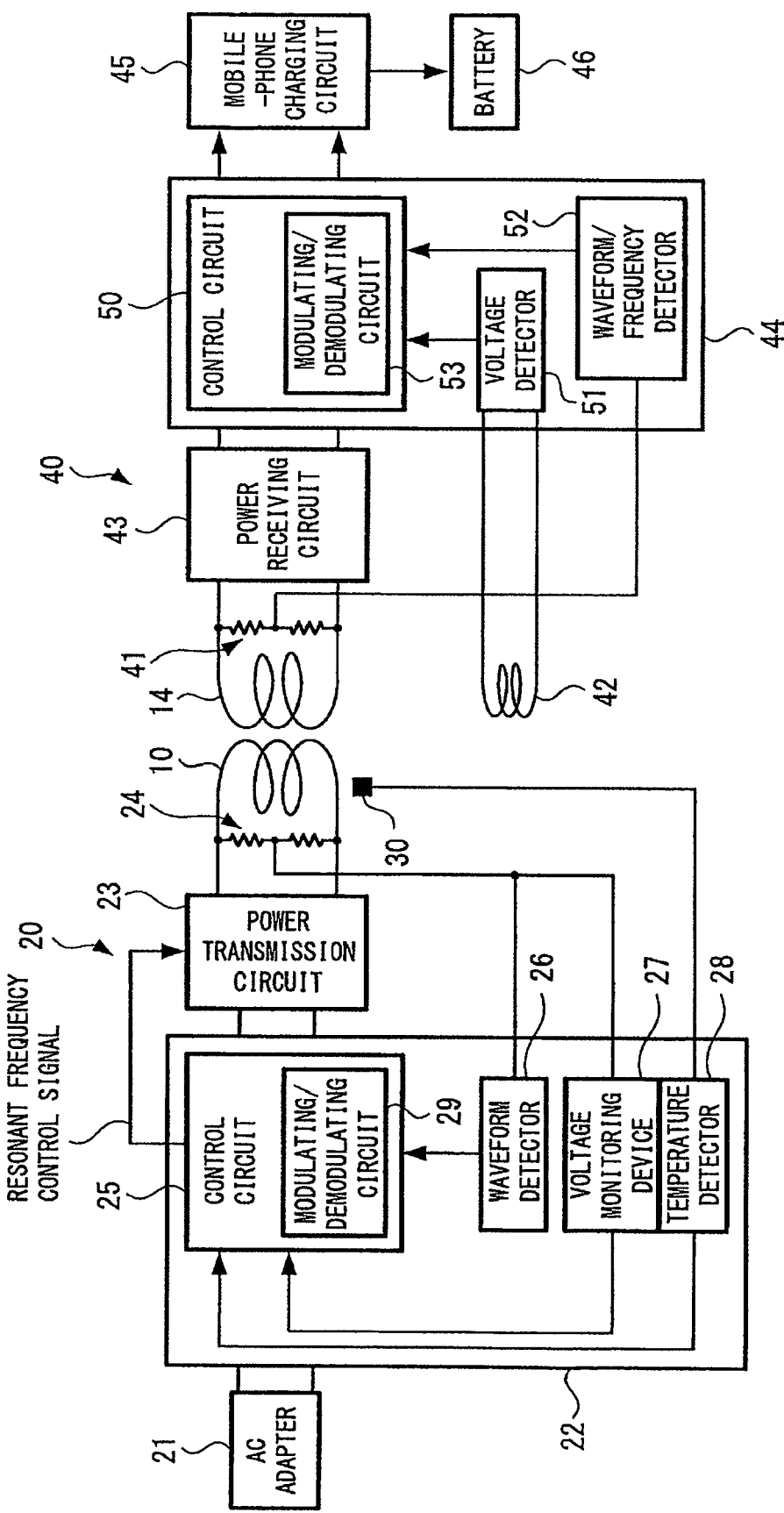
FIG. 29 is a block circuit diagram showing an example configuration where the cradle carries out power transfer control by changing the resonant frequency of the primary-side transfer coil.

FIG. 29 shows an example configuration for a case where the cradle 1 carries out power transfer control by changing the resonant frequency of the primary-side transfer coil 10.

In FIG. 29, an internal circuit 20 of the cradle 1 is included in the control circuit unit 11 shown in FIG. 1 described above and includes, as principal component elements, an AC adapter 21, a power transmission control unit 22, a power transmission circuit 23, and the primary-side transfer coil 10.

The AC adapter 21 converts the domestic AC voltage supplied via the power cord 12 described earlier to a predetermined DC voltage. The DC voltage from the AC adapter 21 is supplied via the power transmission control unit 22 to the power transmission circuit 23.

Figure 30:
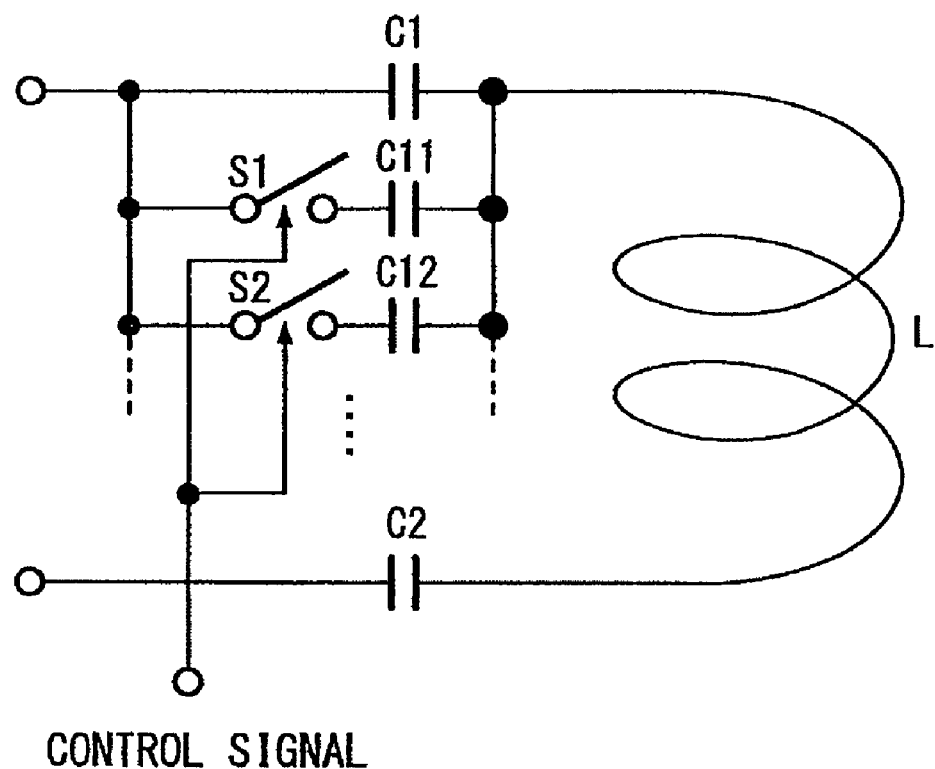
FIG. 30 is a circuit diagram showing a specific example of a resonance circuit capable of changing the resonant frequency.

The power transmission circuit 23 is constructed so as to include at least a oscillation circuit, a driver, and a resonance circuit. As one example, the oscillation circuit generates a standard oscillation signal when transferring charging power from the cradle 1 to the mobile-phone unit 2 and outputs the standard oscillation signal to the driver. Based on control by a control circuit 25 of the power transmission control unit 22, the driver uses the standard oscillation signal supplied from the oscillation circuit to convert the DC voltage described above to an AC voltage of a predetermined frequency. As one example, the resonance circuit includes capacitors and switches as shown in FIG. 30 described later, is connected to the primary-side transfer coil 10, is constructed of the capacitance C of the capacitors and the inductance L of the coil and resonates in accordance with an AC voltage from the driver described above. Accordingly, the primary-side transfer coil 10 is caused to oscillate at a predetermined resonant frequency. The power transmission circuit 23 also transfers information to the mobile-phone unit 2 by superimposing a modulated signal for transmitting information supplied from the control circuit 25 of the power transmission control unit 22 onto the AC signal used for transferring power.

Voltage dividing resistors 24 are connected between both coil ends of the primary-side transfer coil 10 described above. The voltage dividing resistors 24 are provided to divide the voltage between both coil ends of the primary-side transfer coil 10 and send a divided voltage to the power transmission control unit 22.

The power transmission control unit 22 includes the control circuit 25, a waveform detector 26, a voltage monitoring device 27, a temperature detector 28, and the like as principal component elements.

The waveform detector 26 of the power transmission control unit 22 is supplied with an output of the voltage dividing resistors 24 that divide the voltage appearing between both coil ends of the primary-side transfer coil 10. The waveform detector 26 detects the signal waveform of the output of the voltage dividing resistors 24 and outputs a detected waveform signal to the control circuit 25.

When charging power is to be transferred from the cradle 1 to the mobile-phone unit 2, the control circuit 25 controls the driver of the power transmission circuit 23 so that the primary-side transfer coil 10 is supplied with an AC voltage of the predetermined frequency described above from the driver.

Also, the control circuit 25 determines whether the mobile-phone unit 2 has approached or become distant from the terminal mount of the cradle 1 based on the detected waveform signal supplied via the voltage dividing resistors 24 and the waveform detector 26, that is, a detected waveform signal for the voltage waveform that appears between both coil ends of the primary-side transfer coil 10. That is, the control circuit 25 detects, from the detection waveform signal that has passed the voltage dividing resistors 24 and the waveform detector 26, voltage variations in the primary-side transfer coil 10 described above caused by the mobile-phone unit 2 approaching or becoming distant from the terminal mount. Based on the detection of whether the mobile-phone unit 2 has approached or become distant from the terminal mount described above, the control circuit 25 carries out control as necessary to supply or stop supplying an AC voltage from the power transmission circuit 23 to the primary-side transfer coil 10.

The control circuit 25 also includes a modulating/demodulating circuit 29. When transmitting information to the mobile-phone unit 2, the modulating/demodulating circuit 29 generates a signal that has been modulated in accordance with such information and sends the modulated signal to the power transmission circuit 23. By doing so, information is transmitted to the mobile-phone unit 2. On the other hand, when information is received from the mobile-phone unit 2, the control circuit 25 extracts a modulated signal, which has been transmitted from the mobile-phone unit 2 described above, from the detected waveform signal supplied via the voltage dividing resistors 24 and the waveform detector 26 described above. The modulating/demodulating circuit 29 then demodulates the modulated signal described above. Accordingly, it is possible to receive information that has been transmitted from the mobile-phone unit 2.

Here, upon receiving information showing a displacement between the center positions of the coils sent from the mobile-phone unit 2, the control circuit 25 of the cradle 1 calculates the magnitude and direction of the displacement between the center positions of the coils. Further, based on the magnitude and direction of the displacement between the center positions of the coils, the control circuit 25 carries out switching control over the switches of the resonance circuit in FIG. 30 to change the resonant frequency of the primary-side transfer coil 10.

The resonance circuit of the power transmission circuit 23 shown in FIG. 30 includes capacitors with the respective capacitances C1, C2 that are connected in series to the respective ends of the coil that has the inductance L and a plurality of capacitors with the respective capacitances C11, C12, ..., disposed in parallel to both ends of the coil. In addition, switches S1, S2, ..., including FET (field effect transistors) are inserted and connected between (i) the capacitors with the capacitances C11, C12, ..., that are disposed in parallel to both ends of the coil and (ii) an AC signal input terminal at one end of the coil. The switches S1, S2, ..., are subjected to on/off switching control between on and off states (conducting and non-conducting) using a resonant frequency control signal (a switching control signal for the switches) supplied from the control circuit 25. With the resonance circuit shown in FIG. 30, the resonant frequency is changed by switching the switches S1, S2, ..., on and off to switch the capacitances C11, C12, ..., between a connected and a disconnected state. Note that aside from connecting the capacitors with the capacitances C11, C12, ..., in parallel, the resonant frequency may also be changed by cutting off the other capacitors that are connected in series. Although a configuration that changes the resonant frequency by connecting or disconnecting capacitors has been given as an example in FIG. 30, an embodiment of the invention also includes configurations that change the resonant frequency by changing the inductance L of the coil or by changing both the capacitance C and the inductance L.

Accordingly, control over the resonant frequency on the primary side in accordance with a displacement between the center positions of the coils is realized in the cradle 1.

Based on the voltage from the voltage dividing resistors 24, for example, the voltage monitoring device 27 monitors whether an abnormal voltage that is outside a specification of the primary-side transfer coil 10 has been generated or generation thereof can be predicted. On detecting or predicting the generation of such an abnormal voltage outside the specification, the voltage monitoring device 27 sends detection information about such abnormal voltage to the control circuit 25.

Based on the signal from a temperature sensor 30 provided near or inside the primary-side transfer coil 10, for example, a temperature detector 28 monitors whether the primary-side transfer coil 10 has reached an abnormal temperature or whether an abnormal temperature has been predicted. When an abnormal temperature outside the specification has been detected or an abnormal temperature has been predicted, the temperature detector 28 transfers detection information about such abnormal temperature to the control circuit 25.

When at least one of detection information about the abnormal voltage and detection information about the abnormal temperature has been received at the start of power transfer from the cradle 1 to the mobile-phone unit 2, during transfer, or at another time, the control circuit 25 carries out control so that the operation of the power transmission circuit 23 is stopped and the supplying of power to the primary-side transfer coil 10 is stopped or not commenced.

On the other hand, as shown in FIG. 29, an internal circuit 40 on the mobile-phone unit 2 side is included on the circuit board 15 in FIG. 1. The internal circuit 40 includes as principal component elements a power receiving circuit 43, voltage dividing resistors 41, a received power control unit 44, a mobile-phone charging circuit 45, a battery 46 that is a secondary cell, and the leaking flux detecting coil(s) 42 described earlier.

The power receiving circuit 43 includes a rectifying circuit and a regulator as a configuration for receiving power and includes the resonant circuit and driver of the secondary-side transfer coil 14 and a oscillation circuit as the configuration for transmitting information to the cradle 1.

The rectifying circuit of the power receiving circuit 43 converts an output voltage (AC voltage) between both coil ends of the secondary-side transfer coil 14 to a DC voltage and sends the DC voltage to the regulator. The regulator converts the DC voltage supplied from the rectifying circuit to a predetermined voltage used by the charging circuit 45 of the mobile-phone unit described above, and sends the voltage to the received power control unit 44.

The voltage dividing resistors 41 are provided between the secondary-side transfer coil 14 and the power receiving circuit 43 to divide the voltage between both ends of the secondary-side transfer coil 14 and send the divided voltage to the received power control unit 44.

The received power control unit 44 includes a control circuit 50, a voltage detector 51, and a waveform/frequency detector 52 as principal component elements.

The waveform/frequency detector 52 is supplied with the output of the voltage dividing resistors 41 which is produced by dividing the voltage appearing between both ends of the secondary-side transfer coil 14. The waveform/frequency detector 52 detects the signal waveform of the divided voltage output and outputs a detected waveform signal to the control circuit 50. The waveform/frequency detector 52 detects the frequency of the received power signal from the signal waveform of the divided voltage output. A frequency detection signal of the waveform/frequency detector 52 is sent to the control circuit 50.

The voltage detector 51 detects the voltage generated in the leaking flux detecting coil 42 described earlier, carries out A/D conversion on the voltage, and sends a voltage signal after the A/D conversion to the control circuit 50.

When the battery 46 is to be charged by the mobile-phone charging circuit 45, the control circuit 50 sends the power received by the power receiving circuit 43 to the mobile-phone charging circuit 45.

When charging power is supplied from the received power control unit 44, the mobile-phone charging circuit 45 sends charging power to the battery 46 in accordance with the power level of the battery 46 to charge the battery 46.

The control circuit 50 determines whether the mobile-phone unit 2 has approached or has become distant from the terminal mount of the cradle 1 based on the detected waveform signal supplied via the voltage dividing resistors 41 and the waveform/frequency detector 52, that is, the detection waveform signal of the voltage waveform that appears between both end parts of the secondary-side transfer coil 14. That is, the control circuit 50 detects, from the detection waveform signal that has passed the voltage dividing resistors 41 and the waveform/frequency detector 52, voltage variations that occur in the secondary-side transfer coil 14 caused by the mobile-phone unit 2 approaching or becoming distant from the terminal mount. Based on the detection of whether the mobile-phone unit 2 has approached or become distant from the terminal mount, the control circuit 50 carries out control of supplying or stopping the received power to the mobile-phone charging circuit 45.

The control circuit 50 detects the resonant frequency of the secondary-side transfer coil 14 during contactless power transferring from the frequency detection signal supplied via the waveform/frequency detector 52, or in other words, detects the resonant frequency of the primary-side transfer coil 10 of the cradle 1. On detecting a change in the resonant frequency of the primary-side transfer coil 10 of the cradle 1, the control circuit 50 notifies the mobile-phone charging circuit 45 of such change. In response, the mobile-phone charging circuit 45 carries out battery charging control that is optimized for transmitted power that has changed due to the change in the resonant frequency.

The control circuit 50 also includes a modulating/demodulating circuit 53. When information showing a displacement between the center positions of the coils or the like is to be transmitted to the cradle 1 as described earlier, the modulating/demodulating circuit 53 generates a signal modulated in accordance with such information and sends the modulated signal to the power receiving circuit 43. Subsequently, the oscillation circuit of the power receiving circuit 43 generates a standard oscillation signal used when transferring information from the mobile-phone unit 2 to the cradle 1 and outputs the standard oscillation signal to the driver. Based on control by the control circuit 50 of the received power control unit 44, the driver uses the standard oscillation signal from the oscillation circuit to cause the resonance circuit to resonate, thereby oscillating the secondary-side transfer coil 14 at a predetermined resonant frequency. At the same time, in the driver the modulated signal for transmitting information that has been supplied from the control circuit 50 of the received power control unit 44 is superimposed on the standard oscillation signal described above. Accordingly, information is transmitted to the cradle 1.

On the other hand, when information is received from the cradle 1, the control circuit 50 extracts the modulated signal that has been transmitted from the cradle 1 from the detected waveform signal that has been supplied via the voltage dividing resistors 41 and the waveform/frequency detector 52. Subsequently, the modulated signal is demodulated in the modulating/demodulating circuit 53. In this way, information transmitted from the cradle 1 is received.

Figure 31:
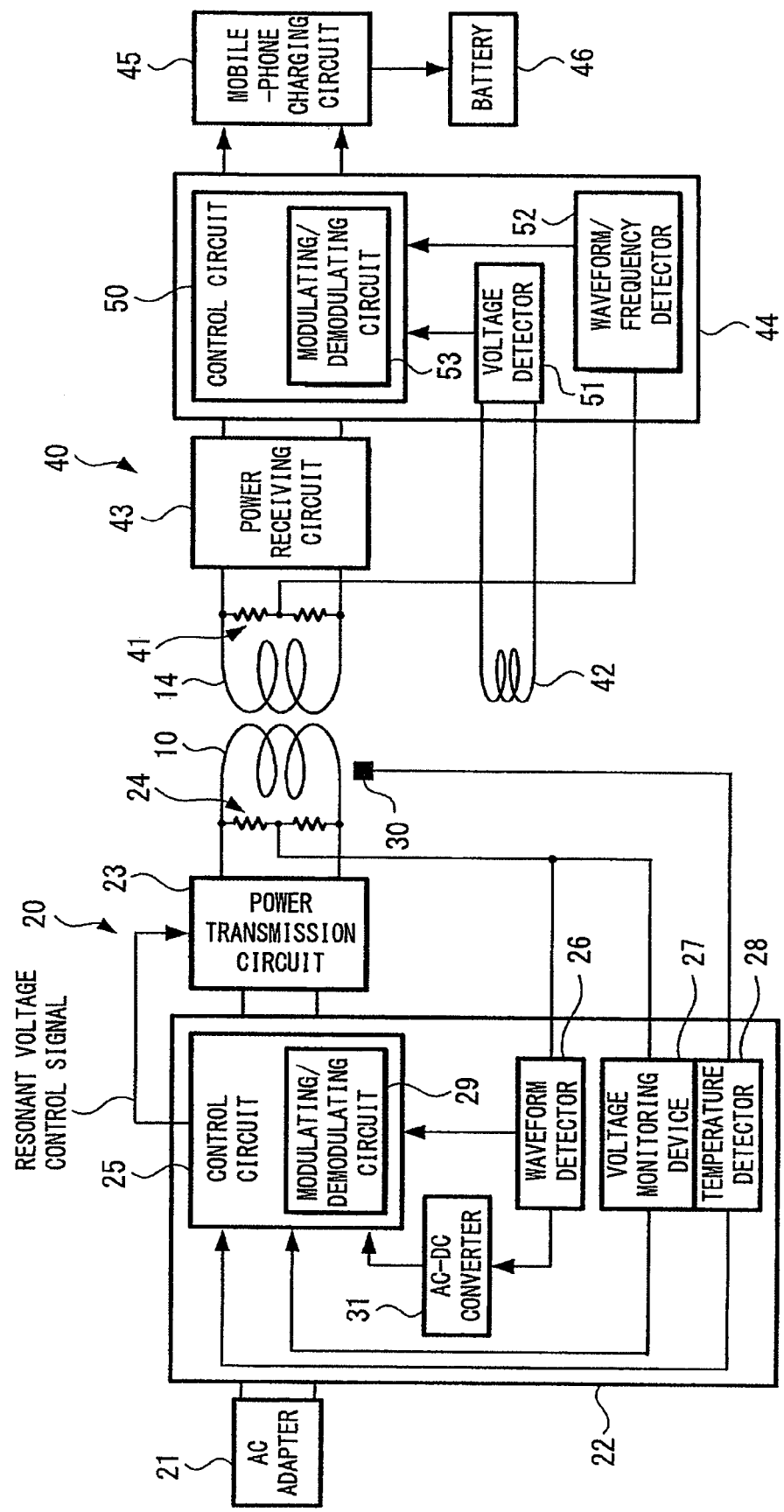
FIG. 31 is a block circuit diagram showing an example configuration where the cradle carries out power transfer control by changing the resonant voltage of the primary-side transfer coil.

Next, FIG. 31 shows an example configuration for a case where the cradle 1 carries out power transfer control by changing the resonant voltage of the primary-side transfer coil 10. Note that in FIG. 31, component elements that are the same as in FIG. 29 have been assigned the same reference numerals and description thereof has been omitted.

As shown in FIG. 31, the power transmission control unit 22 of the cradle 1 includes an AC-DC converter 31. The AC-DC converter 31 converts an AC voltage of the detected waveform signal supplied from the waveform detector 26 to a DC voltage and supplies the DC voltage to the control circuit 25.

The control circuit 25 knows the voltage generated by the primary-side transfer coil 10 from the DC voltage supplied from the AC-DC converter 31 and calculates the resonant voltage of the primary-side transfer coil 10 based on the generated voltage.

Subsequently, when information showing the displacement between the center positions of the coils sent from the mobile-phone unit 2 is received, the control circuit 25 of the cradle 1 calculates the magnitude and direction of the displacement between the center positions of the coils. The control circuit 25 carries out control to change the capacitance C and/or inductance of the resonance circuit shown in FIG. 30, for example, based on the magnitude and direction of the displacement between the center positions of the coils and on a signal showing the resonant voltage of the primary-side transfer coil 10 supplied from the AC-DC converter 31. Thus, the control circuit 25 changes the resonant voltage of the primary-side transfer coil 10. That is, with the configuration shown in FIG. 31, the control signal supplied from the control circuit 25 to the power transmission circuit 23 is a resonant voltage control signal.

Accordingly, control over the resonant voltage on the primary side is realized in the cradle 1 depending on the displacement between the center positions of the coils.

Figure 32:
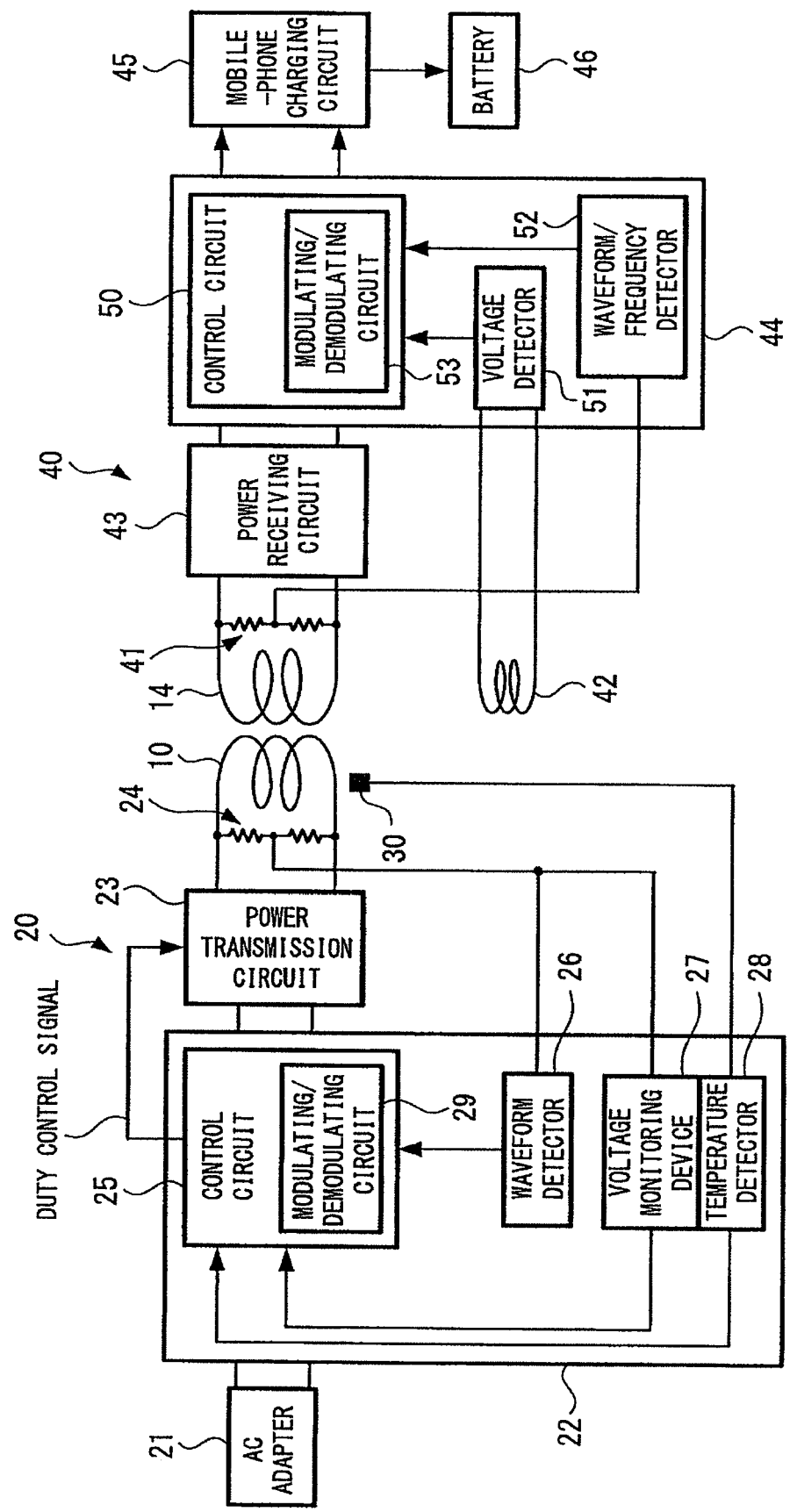
FIG. 32 is a block circuit diagram showing an example configuration where the cradle carries out power transfer control by changing the power transmitted from the primary-side transfer coil.

Next, FIG. 32 shows an example configuration for a case where the cradle 1 carries out power transfer control by changing the power transmitted from the primary-side transfer coil 10. Note that in FIG. 32, component elements that are the same as in FIGS. 29 and 31 have been assigned the same reference numerals and description thereof has been omitted.

According to the configuration shown in FIG. 32, the power transmission circuit 23 includes at least a oscillation circuit, a driver, and a resonance circuit. The resonance circuit may include a plurality of capacitors C11, C12, . . . , and switches S1, S2, . . . , similarly to the configuration shown in FIG. 30 described earlier, but may not include such elements.

Also, in the example shown in FIG. 32, the oscillation circuit of the power transmission circuit 23 is capable not only of a continuous oscillating operation for the standard oscillating signal but also of an intermittent oscillation operation.

With the example configuration shown in FIG. 32, when information showing a displacement between the center positions of the coils sent from the mobile-phone unit 2 has been received, the control circuit 25 of the cradle 1 calculates the magnitude and direction of the displacement between the center positions of the coils. Subsequently, the control circuit 25 carries out control that causes the oscillation circuit of the power transmission circuit 23 to intermittently oscillate based on the magnitude and direction of the displacement between the center positions of the coils. That is, with the configuration shown in FIG. 32, a control signal sent from the control circuit 25 to the power transmission circuit 23 is a duty control signal for causing the oscillation circuit to operate intermittently.

Accordingly, control over the transmitted power on the primary side is realized in the cradle 1 depending on the displacement between the center positions of the coils.

According to the above-described embodiments of the invention, a leaking flux detecting coil 42 for detecting leaking flux for the secondary-side transfer coil 14 is provided in the mobile-phone unit 2. Subsequently, based on a voltage detected by the leaking flux detecting coil 42, a displacement between the center positions of the primary-side transfer coil 10 of the cradle 1 and the secondary-side transfer coil 14 of the mobile-phone unit 2 is detected. The resonant frequency, resonant voltage, and/or transmitted power is/are controlled on the cradle 1 side based on the detected displacement between the center positions of the coils. Accordingly, it is possible to suppress the generation of heat due to a displacement between the center positions of the coils and to carry out optimal power transmission in accordance with the displacement between the center positions of the coils and thereby suppress a fall in transfer efficiency. Therefore, according to the embodiments, it is possible to thoroughly avoid a situation where the transfer of power stops due to a displacement between the center positions of the coils.

The embodiments described above are merely examples of the invention. It should therefore be obvious that the invention is not limited to the embodiments described above and can be subjected to various modifications for design and other purposes without departing from the technical scope of the invention.

Although the leaking flux detecting coil(s) is/are provided separately in the embodiments described above, it is also possible to provide a coil antenna that is used for an RFID (Radio Frequency-Identification) contactless IC card function that can be used in an electronic wallet, a train ticket or train pass, or for user authentication at an entryway. Such coil antenna may be disposed in the periphery of the secondary-side transfer coil 14 described above so as to also serve as the leaking flux detecting coil.

Further, according to the embodiments described above, an example where the signal that shows the generated voltage of the leaking flux detecting coil 42 is fed back to the cradle 1 via the secondary-side transfer coil 14 and the primary-side transfer coil 10 has been described. In addition, the signal may be transferred using an information transfer device other than the primary-side and secondary-side transfer coils, such as wireless LAN, Bluetooth®, or a coil antenna for contactless IC card function described above.

Also, although an example where the leaking flux detecting coil(s) 42 is/are provided on the mobile-phone unit 2 has been described in the above embodiments, the leaking flux detecting coil(s) may be provided on the cradle 1 side. In this case, the voltages detected by the leaking flux detecting coils may not need to be fed back from the mobile-phone unit 2 to the cradle 1. It should be appreciated that leaking flux detecting coils may be provided in both the mobile-phone unit 2 and the cradle 1.

In addition, a mobile-phone unit 2 and a cradle 1 for the mobile-phone unit 2 have been described as examples in the above embodiments. However, the invention is not limited thereto, and can be applied to various types of electronic appliance, such as a PDA (Personal Digital Assistant), a digital camera, a portable audio device, a portable video device, a portable navigation apparatus, and cradles for such electronic appliances.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal comprising:
   a secondary cell;
   a contactless power transferring coil unit including a flat coil formed by winding a conductive wire into a spiral on a substantially flat plane, a magnetic film disposed so as to cover one entire flat surface of the flat coil, and a leaking flux detecting coil that is disposed in a periphery outside an outer edge of the flat coil and the magnetic film and detects leaking magnetic flux from the flat coil, the contactless power transferring coil unit using electromagnetic induction between the flat coil and a coil provided in a power transmitting apparatus for transmitting power according to a contactless power transferring method to receive power transmitted from the power transmitting apparatus according to the contactless power transferring method;
   a charging control circuit that controls charging of the secondary cell with the power received via the flat coil of the contactless power transferring coil unit; and
   a signal transmitting unit that transmits a signal, in accordance with leaking magnetic flux detected by the leaking flux detecting coil of the contactless power transferring coil unit, to the power transmitting apparatus.

2. A mobile terminal according to claim 1, wherein the leaking flux detecting coil is formed of at least one winding of a conductive wire and has a larger diameter than the flat coil and the magnetic film.

3. A mobile terminal according to claim 1, wherein the leaking flux detecting coil is formed of a plurality of small flat coils that are formed by winding a conductive wire into spirals and are disposed in a periphery outside an outer edge of the flat coil and the magnetic film.

4. A mobile terminal according to claim 1, wherein the plurality of small flat coils are disposed in at least four directions on X and Y axes relative to a center axis of the flat coil.

5. A mobile terminal according to claim 1, wherein the magnetic film forms a magnetic path between the flat coil and the coil provided in the power transmitting apparatus for transmitting power.

6. A mobile terminal according to claim 1, wherein the magnetic film suppresses unnecessary radiation caused by magnetic fields created by the flat coil and the coil provided in the power transmitting apparatus for transmitting power.

7. A mobile terminal according to claim 1, wherein the magnetic film includes a metal sheet.

8. A mobile terminal according to claim 1, wherein the leaking magnetic flux is magnetic flux produced by the power transmitting apparatus for transmitting power that is not received by received by the flat coil or the magnetic film.

* * * * *